(12) United States Patent
Okamoto et al.

(10) Patent No.: US 6,912,300 B1
(45) Date of Patent: Jun. 28, 2005

(54) IRREGULAR PATTERN READER

(75) Inventors: Tatsuki Okamoto, Tokyo (JP); Yukio Sato, Tokyo (JP); Junichi Nishimae, Tokyo (JP); Hiroyuki Kawano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 614 days.

(21) Appl. No.: 09/621,553

(22) Filed: Jul. 21, 2000

Related U.S. Application Data

(63) Continuation of application No. PCT/JP99/04463, filed on Aug. 20, 1999.

(51) Int. Cl.[7] .............................. G06K 9/00; G02B 5/04
(52) U.S. Cl. ........................ 382/127; 382/124; 359/833
(58) Field of Search ................................ 382/127, 115, 382/116, 124, 126, 125; 356/71; 359/2, 431, 436, 437, 438, 439, 440, 601, 602, 603, 604, 605, 606, 607, 608, 625, 638, 640, 642, 668, 669, 670, 831, 833, 834, 835, 836, 837

(56) References Cited

U.S. PATENT DOCUMENTS

| | | | | |
|---|---|---|---|---|
| 3,716,301 A | * | 2/1973 | Caulfield et al. ............ 356/394 |
| 3,928,842 A | * | 12/1975 | Green et al. ................ 382/124 |
| 3,975,711 A | * | 8/1976 | McMahon ................... 382/126 |
| 4,414,684 A | * | 11/1983 | Blonder ...................... 382/127 |
| 4,684,802 A | * | 8/1987 | Hakenewerth et al. ....... 250/235 |
| 4,728,186 A | * | 3/1988 | Eguchi et al. ................ 356/71 |
| 4,805,223 A | * | 2/1989 | Denyer ....................... 382/127 |
| 4,905,293 A | | 2/1990 | Asai et al. |
| 4,924,085 A | * | 5/1990 | Kato et al. .............. 250/227.28 |
| 5,146,102 A | * | 9/1992 | Higuchi et al. ............. 250/556 |
| 5,493,621 A | * | 2/1996 | Matsumura ................. 382/125 |
| 5,596,454 A | * | 1/1997 | Hebert ........................ 359/726 |
| 5,621,516 A | * | 4/1997 | Shinzaki et al. ............... 356/71 |
| 5,629,764 A | * | 5/1997 | Bahuguna et al. ............ 356/71 |
| 5,974,162 A | * | 10/1999 | Metz et al. .................. 382/124 |
| 6,127,674 A | * | 10/2000 | Shinzaki et al. ....... 250/227.28 |
| 6,185,319 B1 | * | 2/2001 | Fujiwara ..................... 382/127 |
| 6,381,347 B1 | * | 4/2002 | Teng et al. .................. 382/127 |
| 6,414,749 B1 | * | 7/2002 | Okamoto et al. ............. 356/71 |

FOREIGN PATENT DOCUMENTS

| | | |
|---|---|---|
| JP | 52-23018 | 5/1977 |
| JP | 61-255482 | 11/1986 |
| JP | 3-246693 | 11/1991 |
| JP | 6-83944 | 3/1994 |
| JP | 7-98753 | 4/1995 |

* cited by examiner

*Primary Examiner*—Jingge Wu
*Assistant Examiner*—Ryan J. Hesseltine
(74) *Attorney, Agent, or Firm*—Leydig, Voit & Mayer, Ltd.

(57) ABSTRACT

An object of the invention is to achieve a small and thin irregular pattern reader comprising: a prism possessing a detection surface on which a subject to be detected having an irregular pattern is put and an incident plane having a first angle of inclination to the detection surface and emitting a light reflected on the detection surface corresponding to an incident light incident upon the incident plane; a first optical system possessing a light source and causing a light from the light source to be incident upon the incident plane of the prism with its optical axis substantially in parallel to the detection surface; and a second optical system for transmitting the emission light emitted from the prism to an image pick-up device.

18 Claims, 24 Drawing Sheets

IRREGULAR PATTERN READER

CROSS-REFERENCE TO THE RELATED APPLICATION

The Application is a Continuation of International Application PCT/JP99/04463, whose international filing date is Aug. 20, 1999, the disclosure of which application is incorporated by reference herein.

TECHNICAL FIELD

The present invention relates to an irregular pattern reader for reading a face of an irregular pattern such as a fingerprint.

BACKGROUND ART

FIG. 34 is a schematic view of a conventional irregular pattern reader, as is described in, for example, the Japanese Patent Publication (unexamined) Sho. 550 12442. In the drawing, reference symbol L is an incident luminous flux from a light source 100. Reference numeral 101 a fingerprint detection prism. Numeral 102 is an incident plane of the detection prism 101, which is a plane on which the incident luminous flux L is incident. Numeral 103 is a detection surface of the detection prism 101, and is a base on which a finger is put to detect a fingerprint. Numeral 104 is an emission plane, which is a plane from which light reflected from the detection surface 103 is emitted. In the detection surface 103 of the detection prism 101, an incident angle ($\theta$I) of the incident luminous flux is not less than a critical angle ($\theta$c) to the air.

Numeral 105 is a person's fingertip having an irregular pattern as a subject to be detected. Numeral 106 is an irregular pattern of a fingerprint or the like. Numeral 107 is an image pick-up device for picking up an image of the irregular pattern 106 of the fingerprint, being light reflected from the detection surface 103. Numeral 108 is a processor for processing the image picked up by the image pick-up device 107. Numeral 109 is an image-forming lens for forming the image of the fingerprint pattern onto a light-receiving plane of the image pick-up device 107. The image pick-up device 107 is, for example, a television camera.

Described below is operation of the conventional irregular pattern reader of above construction. When the incident luminous flux L incoming from the incident plane 102 irradiates the fingertip 105 on the detection surface 103 of the detection prism 101, since the incident angle ($\theta$I) of the incident luminous flux L is not less than the critical angle ($\theta$c) to the air and not more than a critical angle to a finger, light is transmitted to the finger at a portion where a projection face of the fingerprint or the like is in close contact with the detection surface 103, and less light is reflected from the detection surface 103. On the other hand, when there is an air layer due to a recession face of the fingerprint or the like between the detection surface 103 and the fingertip 105, the incident light is totally reflected on the detection surface 103. An image reflected on the detection surface 103 is detected by the television camera as the image pick-up device 107 and is processed by the processor 108, and thus pattern information of the fingerprint is obtained.

Since the conventional irregular pattern reader shown in FIG. 34 is constructed as described above, in order to pick up an image with less distortion, it is necessary that the image-forming lens be sufficiently distant from the fingerprint detection surface. Therefore, the whole length of the reader becomes long, and an optical path from the light source to the fingerprint detection prism and an optical path from the detection surface of the fingerprint detection prism to the image-forming lens cross each other at right angles. As a result, a problem exists in that the reader becomes thick and large.

The present invention was made to solve the above-discussed problems, and has an object of providing a small and thin irregular pattern reader.

DISCLOSURE OF THE INVENTION

An irregular pattern reader according to the invention comprises: a prism possessing a detection surface on which a subject to be detected having an irregular pattern is put and an incident plane having a first angle of inclination to said detection surface, and emitting a light reflected on said detection surface corresponding to a light incident upon said incident plane; a first optical system possessing a light source and causing a light from the light source to be incident on the incident plane of said prism with its optical axis substantially in parallel to said detection surface; and a second optical system for transmitting the emission light emitted from said prism to an image pick-up device. As a result, it is possible to achieve a small and thin irregular pattern reader.

It is preferable that said emission light is emitted substantially in parallel to said detection surface. As a result, it is possible to achieve a small and thin irregular pattern reader.

It is preferable that said prism possesses an emission plane having a second angle of inclination to said detection surface, and said emission light is emitted from said emission plane. As a result, it is possible to achieve a small and thin irregular pattern reader.

It is preferable that said emission light is emitted from said prism in a direction opposite to said incident light. As a result, it is possible to achieve a small and thin irregular pattern reader.

It is preferable that said prism possesses a reflection surface having a third angle of inclination to said detection surface, and said light from said detection surface turned at said reflection surface is emitted from said prism as said emission light. As a result, it is possible to reduce number of parts and achieve a small and thin irregular pattern reader.

It is preferable that said first optical system is provided with first incident light turning means for receiving and turning said incident light from said light source and causing said incident light to be incident on said incident plane. As a result, it is possible to achieve a small and thin irregular pattern reader.

It is preferable that said second optical system is provided with emission light turning means for receiving and turning said emission light and forming an image on an image pick-up plane of said image pick-up device. As a result, it is possible to achieve a small and thin irregular pattern reader.

It is preferable that said second optical system possesses lenses of different magnifications respectively in vertical direction and in horizontal direction, and said lenses converge said emission light in vertical direction or in horizontal direction and form an image on said image pick-up plane of said image pick-up device. As a result, the image is reproduced in high quality, and it is possible to achieve a small and thin irregular pattern reader.

It is preferable that said prism is provided with luminous flux converging means for horizontally converging said emission light on said detection surface. As a result, the image is reproduced in high quality, and it is possible to achieve a small and thin irregular pattern reader.

It is preferable that said prism possesses a reflection surface for reflecting said light reflected on said detection surface and a lens portion for receiving the light from said reflection surface and emitting the light to said second optical system, and said image pick-up plane of said image pick-up device for receiving the light from said second optical system is located substantially in parallel to said detection surface. As a result, it is possible to reduce number of parts and achieve a small and thin irregular pattern reader.

It is preferable that the light reflected on said detection surface is reflected again on said incident plane, and the light is emitted as emission light through said reflection surface. As a result, it is possible to make the detection prism thin and achieve a small and thin irregular pattern reader.

It is preferable that said first angle is less than 45° and more than an angle (θ3) obtained by subtracting an angle of reflection at said detection surface from 90°. As a result, it is possible to achieve a small and thin irregular pattern reader.

It is preferable that a region where a luminous flux in said prism has not passed yet is omitted from a plane of said prism facing said detection face. As a result, it is possible to achieve a small and thin irregular pattern reader.

It is preferable that said detection surface of said detection prism is approximately 20 mm in width and approximately 15 mm in length, while said prism is not more than 10 mm in thickness from said detection surface of said prism to the image pick-up device. As a result, it is possible to build the reader in a notebook-type personal computer or the like.

It is preferable that said first optical system possesses said light source located on an electronic substrate, a second collimator lens, and second incident light turning means located between said light source and said second collimator lens, and said incident light is incident upon said incident plane through said light source, said second incident light turning means, and said second collimator lens in order. As a result, the distance from the light source to the collimator lens is shortened while keeping the optical distance from the light source to the collimator lens, and it is possible to shorten the reader.

It is preferable that said second turning optical means is formed en block of transparent resin or glass, and an incident light emission plane of said second turning means is provided with said second collimator lens. As a result, the distance from the light source to the collimator lens is shortened while keeping the optical distance from the light source to the collimator lens, and it is possible to shorten the reader and reduce number of parts.

It is preferable that said second optical system is located on said image pick-up plane of said image pick-up device. As a result, it is possible to achieve a small and thin irregular pattern reader.

It is preferable that said second turning means is not more than 10 mm in thickness. As a result, it is possible to build the reader in a notebook-type personal computer or the like.

It is preferable that said first optical system, said prism in which a region where a luminous flux in said prism has not passed yet is omitted from a plane facing said detection surface, said second optical system, and said image pick-up device are respectively located on said electronic substrate, and a shape including each of the elements mounted on said electronic substrate has a thickness of 10 mm or less and a length of 35 mm or less provided that said detection surface of said prism is approximately 20 mm in width and approximately 15 mm in length. As a result, it is possible to build the reader in a notebook-type personal computer or the like.

It is preferable that said image pick-up device is mounted as a bare chip on the electronic substrate or on said first optical system. As a result, it is possible to make the reader thinner.

BEST MODE FOR CARRYING OUT THE INVENTION

The invention is hereinafter described in detail with reference to the accompanying drawings.

Figure 1:
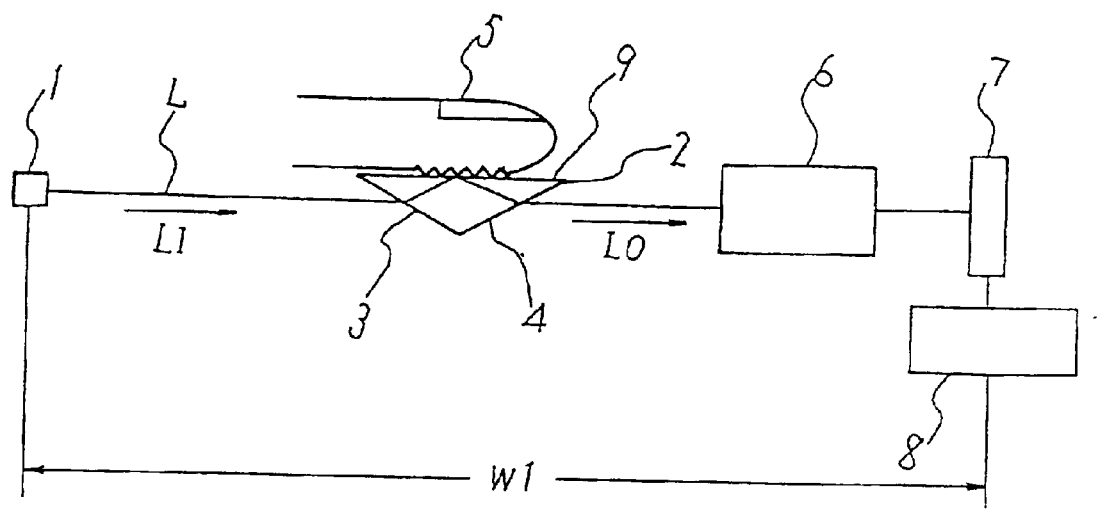
FIG. 1 is a schematic view showing a construction of an irregular pattern reader according to Mode 1 of the present invention.

Mode 1:

. FIG. 1 is a schematic view showing a construction of an irregular pattern reader according to Mode 1 of the invention. In the drawing, reference numeral 1 is a light source, numeral 2 is a detection prism, and numeral 3 is an incident plane of the detection prism 2. Numeral 4 is an emission plane of the detection prism 2, and numeral 5 is a fingertip of a person as a subject to be detected. The light source 1 is used to make a luminous flux L (an incident luminous flux LI) be incident in parallel to a detection surface 9 of the detection prism 2, and is composed of an LED or an LD. The detection prism 2 reads an irregular pattern of the fingerprint or the like, and possesses a detection surface 9 on which the irregular pattern of the fingertip 5 as the subject to be detected is put, the incident plane 3 upon which the incident luminous flux LI from the light source 1 is incident, and the emission plane 4 for emitting a reflected light from the detection surface 9 as an emission luminous flux L0. An angle between the detection surface 9 and the incident plane 3 of the detection prism 2 and an angle between the detection surface 9 and the emission plane 4 are respectively formed in order that a reflected image of the irregular pattern of the fingertip 5 due to the incident luminous flux LI which has come from the incident plane 3 may be emitted as the emission luminous flux L0 from the emission plane 4 in parallel to the incident luminous flux LI. The detection prism 2 is composed of, for example, glass or resin.

Numeral 6 is an optical system for converging the emission luminous flux L0 emitted from the reflected on t surface 9 of the detection prism 2 within a light detecting plane of an image pick-up device 7. The image pick-up device 7 picks up the reflected image emitted from the detection prism 2, and is composed of, for example, a CCD or a CMOS sensor. Numeral 8 is a processor for processing image data picked up by the image pick-up device 7.

Figure 2:
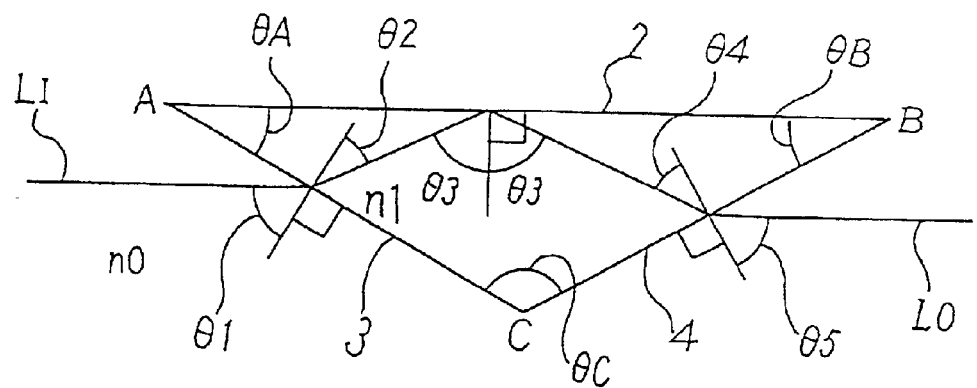
FIG. 2 is an enlarged view of a detection prism 2 shown in FIG. 1.

FIG. 2 is an enlarged view of the detection prism 2 shown in FIG. 1. $\theta 1$ is an incident angle to the incident plane 3 of the detection prism 2, $\theta 2$ is a refraction angle at the incident plane 3 of the detection prism 2, $\theta 3$ is an incident angle and an angle of reflection at the detection surface 9, $\theta 4$ is an incident angle to the emission plane 4 of the detection prism 2, and $\theta 5$ is a refraction angle at the emission plane 4 of the detection prism 2. A, B and C are angular vertexes of the detection prism 2, $\theta A$ is an angle between the detection surface 9 and the incident plane 3 of the detection prism 2, and $\theta B$ is an angle between the detection surface 9 and the emission plane 4 of the detection prism 2. $\theta C$ is an angle between the incident plane 3 and the emission plane 4. $n0$ is an index of refraction of the air, and $n1$ is an index of refraction of the detection prism 2.

In the detection prism 2, the angle $\theta A$ is arranged in order that the incident luminous flux LI incident on the incident plane 3 in parallel to the detection surface 9 may irradiate the whole irregular pattern of the fingertip 5. $\theta B$ is arranged in order that the emission luminous flux L0 from the reflected image of the irregular pattern may be emitted in parallel to the detection surface 9.

The incident angle $\theta 3$ at the detection surface 9 is established to satisfy a requirement of being not less than a critical angle to a boundary with the air and to satisfy a requirement of being not more than a critical angle to a boundary with the subject to be detected such as the fingerprint. Light is not totally reflected but is transmitted through inside the finger in a portion where a projection face of the fingerprint or the like is in close contact with the detection surface 9. An air layer is formed on a recess of the fingerprint or the like, thus the requirements of total reflection are satisfied.

Described below is operation of the irregular pattern reader according to Mode 1.

In the detection prism 2, the angle $\theta A$ is established in order that the incident luminous flux LI incident in parallel to the detection surface 9 may irradiate the whole irregular pattern of the fingertip 5, and the angle $\theta B$ is established so that the emission luminous flux L0 from the reflected image on the detection surface 9 may be emitted in parallel to the detection surface 9. As a result, the incident luminous flux LI and the emission luminous flux L0 are parallel to the detection surface 9.

Since the incident luminous flux LI and the emission luminous flux L0 are thus parallel to the detection surface 9, it is possible to achieve a thin irregular pattern reader.

The fact that the incident luminous flux LI and the emission luminous flux L0 are parallel includes both of (1) a construction in which the incident luminous flux LI and the emission luminous flux L0 are parallel to each other and (2) a construction in which they are substantially in parallel to each other.

In other words, a construction in which the incident luminous flux LI and the emission luminous flux L0 are in a straight line and a construction in which the incident luminous flux LI and the emission luminous flux L0 are substantially in parallel and they are either a convergent luminous flux or a divergent luminous flux, are both included.

The standard of being substantially in parallel includes a small extension width in vertical direction to the extent that it is possible to make the reader thin.

Figure 3:
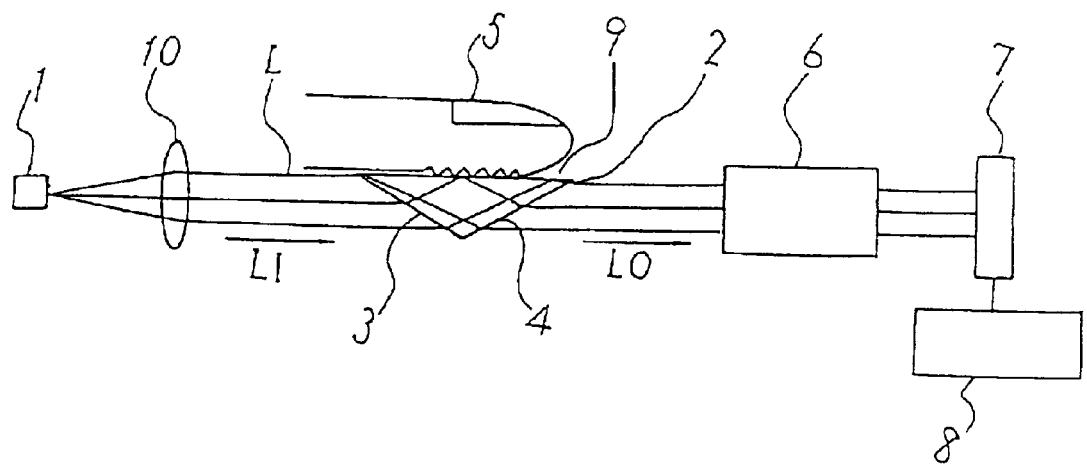
FIG. 3 is a schematic view showing a construction of another irregular pattern reader according to Mode 1.

FIG. 3 is a schematic view showing a construction of another irregular pattern reader according to Mode 1. FIG. 1 shows a construction in which the incident luminous flux LI directly comes from the light source 1 into the detection prism 2. On the other hand, in FIG. 3, a collimator lens 10 is inserted between the light source 1 and the detection prism 2 corresponding to a divergence angle of the light source 1. The light is incident as a convergent luminous flux or a divergent luminous flux upon the incident plane 3 of the detection prism 2.

A construction in which the incident luminous flux LI and the emission luminous flux L0 are parallel to the detection surface 9 of the detection prism 2 is the most preferable in order to make the reader thin. However, it is also preferable that the incident luminous flux LI or the emission luminous flux L0 is inclined a little in a range in which it is possible to make the reader thin.

Figure 4:
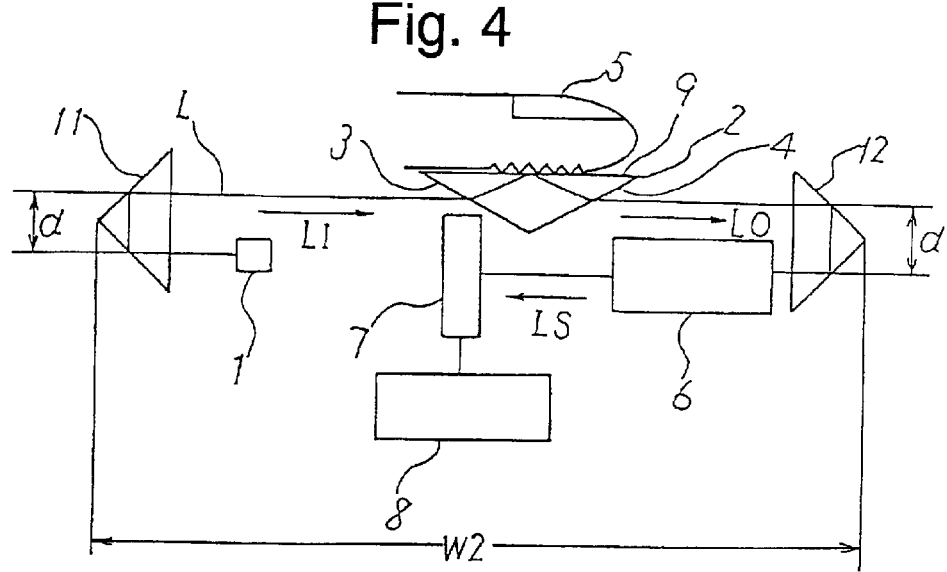
FIG. 4 is a schematic view showing a construction of an irregular pattern reader according to Mode 2 of the invention.

Mode 2:

FIG. 4 is a view showing a construction of an irregular pattern reader according to Mode 2 of the invention. In the drawing, reference numeral 11 is an incident luminous flux turning prism for turning a luminous flux L generated at the light source 1 to the opposite direction. Numeral 12 is an emission luminous flux turning prism for turning the emission luminous flux L0 to the opposite direction. Other numerals are the same as those in Mode 1, and further explanation of them is omitted.

Then, operation is described below. The luminous flux L generated from the light source 1 goes to the detection prism 2 while spreading to a certain extent. Distribution of light at the subject to be detected becomes uniform on condition that the detection prism 2 is located at the position where the luminous flux is spread to a certain extent. Therefore, a certain distance, i.e., an optical-path length, is required between the light source 1 and the detection prism 2.

In this mode, it is possible to achieve an irregular pattern reader which is thin and short in length, keeping the optical-path length on the incident side by turning the luminous flux L generated from the light source 1 to the opposite direction in parallel to the incident luminous flux LI, with the luminous fluxes close to each other at a distance d, for example, within approximately 10 mm.

As for the emission luminous flux, the optical system 6 of short focal distance is required in order to shorten an optical-path length from the detection prism 2 to the image pick-up device 7. Image is largely distorted in an optical system of short focal distance. It is therefore possible to achieve an irregular pattern reader thin and short in length keeping the optical-path length on the emission side by making the distance d between the luminous fluxes to be, for example, within 10 mm in parallel to the emission luminous flux L0.

In this mode, the turning luminous flux distance d on the emission side and the turning luminous flux distance d on the incidence side are both the same, however, it is also preferable that they are different.

Thus, by establishing the luminous flux turning prisms 11, 12 as described above, it becomes possible to achieve an irregular pattern reader of which length w2 is short keeping the optical-path length on the incident side and the optical-path length on the emission side.

In this Mode 2, the turning prisms 11, 12 are located on both of the incident plane 3 side and the emission plane 4 side of the detection prism 2, however, it is also preferable that a turning prism is located on either side.

Figure 5:
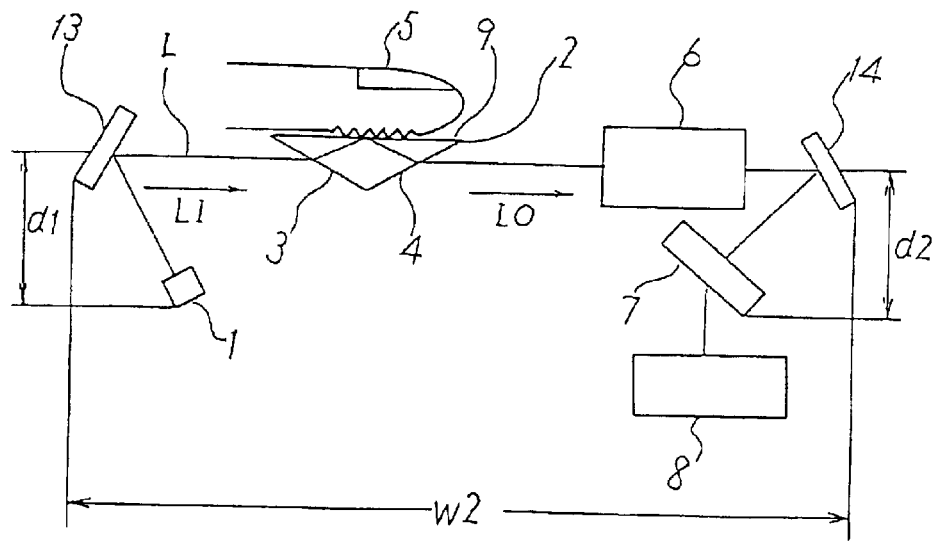
FIG. 5 is a schematic view of an irregular pattern reader of another construction according to Mode 2.

FIG. 5 is a schematic view of an irregular pattern reader of another construction according to Mode 2. In the drawing, each of numerals 13 and 14 is a reflex mirror. FIG. 4 illustrates a construction of turning the luminous flux in parallel on both of the incident plane 3 side and the emission plane 4 side. Further, it is also preferable that the luminous flux before being turned and the luminous flux after being turned are not always parallel as shown in FIG. 5. In this construction, it is preferable that the luminous fluxes are not parallel on condition that a vertical distance d1 between the light source 1 and the turned incident luminous flux LI is small to the extent that it is possible to make the thickness thin. The same is applied to the relation to a distance d2 between the emission luminous flux L0 and the image pick-up device 7.

Figure 6:
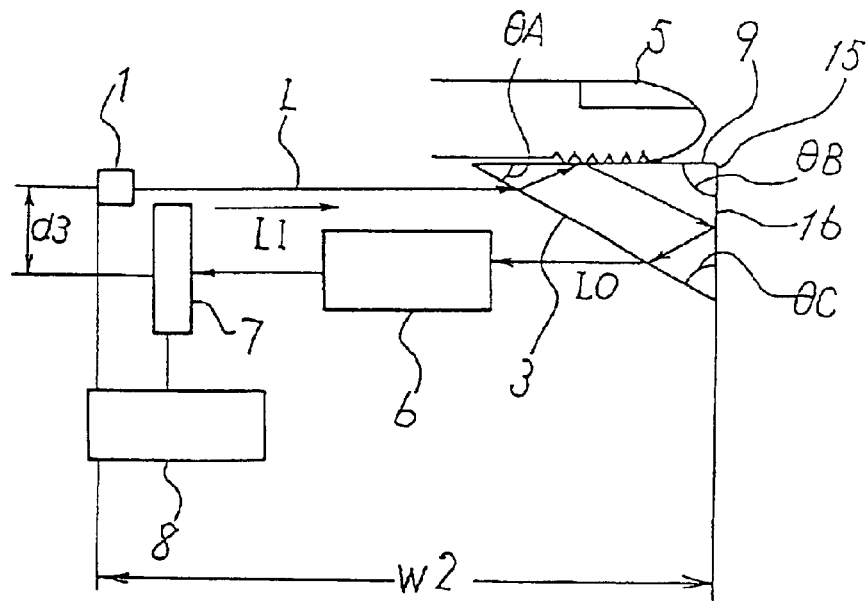
FIG. 6 is a schematic view showing a construction of an irregular pattern reader according to Mode 3 of the invention.

Mode 3:

FIG. 6 is a schematic view showing a construction of an irregular pattern reader according to Mode 3 of the invention. In the drawing, reference numeral 15 is a fingerprint detection prism to serve as an irregular pattern detection prism. The fingerprint detection prism 15 possesses a detection surface 9 for placing the fingertip 5 as the subject to be detected, and the angles of the prism are respectively arranged in order that the incident luminous flux LI which has come from the incident plane 3 may irradiate the whole irregular pattern of the fingertip 5, and a reflected image of the irregular pattern may be turned at an inner wall 16 and emitted as the emission luminous flux L0 oppositely and in parallel to the incident luminous flux LI. A distance d3 between the incident luminous flux LI and the emission luminous flux L0 is short, for example, approximately 10 mm. The optical system 6 and the image pick-up device 7 are located to be thin in the emitting direction of the emission luminous flux L0.

Then, operation is described below. As shown in FIG. 6, the luminous flux L which comes from the light source 1 into the incident plane 3 irradiates the whole detection surface 9 as the incident luminous flux LI owing to the angle θA established between the detection surface 9 and the incident plane 3. Next, owing to establishment of θB, the emission luminous flux L0 emitted from the reflected image of the irregular pattern is turned at the inner wall 16 of the fingerprint detection prism 15 and is emitted oppositely and in parallel to the incident luminous flux LI.

The optical system 6 and the image pick-up device 7 are located to be thin in the emitting direction of the emission luminous flux L0. It is therefore possible to shorten the distance d3 between the incident luminous flux LI and the emission luminous flux L0 and shorten the optical-path length w2 in the direction of the incident luminous flux and the emission luminous flux. As a result, it is possible to achieve an irregular pattern reader which is thin and short in length.

Figure 7:
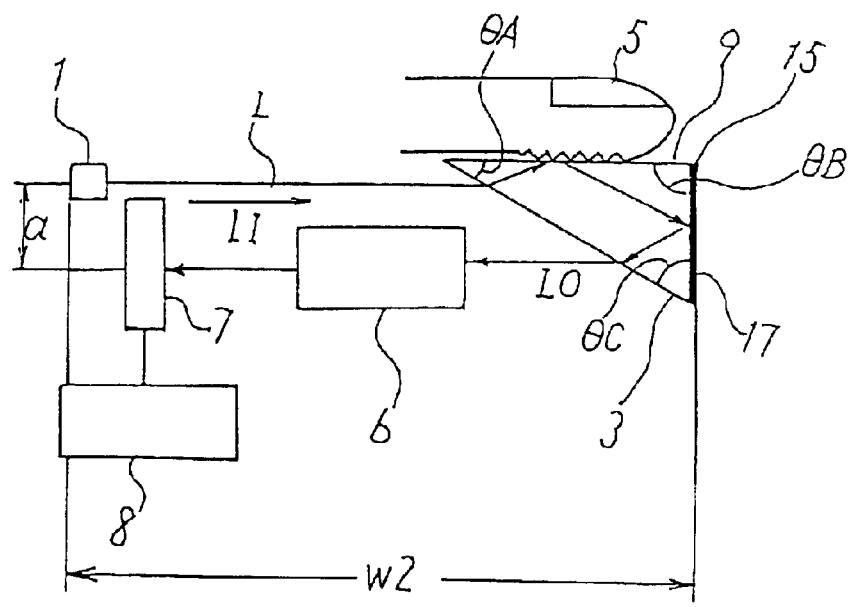
FIG. 7 is a schematic view of an irregular pattern reader of another construction according to Mode 3.

When the inner wall 16 of the detection prism 15 for turning the reflected image has a small reflectance, it is preferable to locate a reflection member 17 on the outside of the inner wall 16 of the detection prism 15 as shown in FIG. 7.

Figure 8:
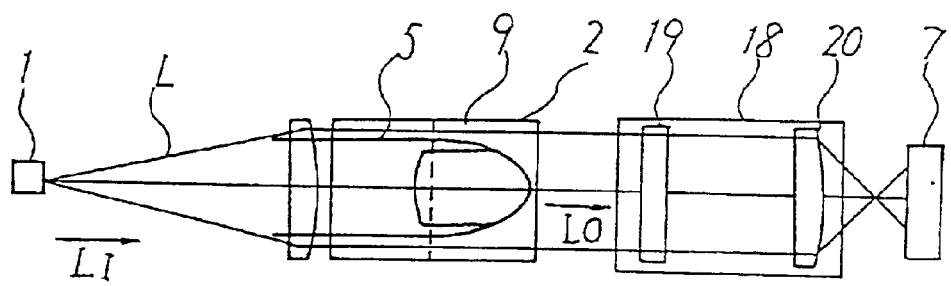
FIG. 8 is a top view of an irregular pattern reader according to Mode 4 of the invention.
Figure 9:
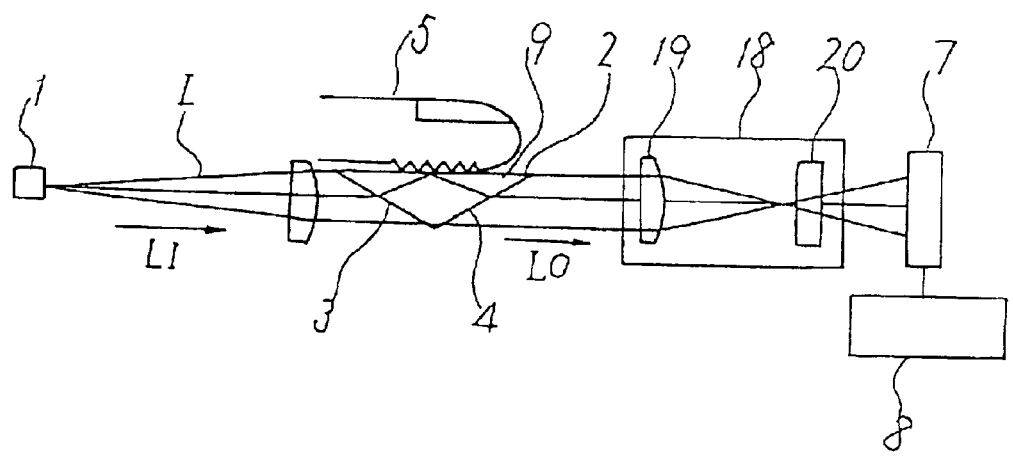
FIG. 9 is a side view of the irregular pattern reader shown in FIG. 8.

Mode 4:

FIG. 8 is a top view of an irregular pattern reader according to Mode 4 of the invention. FIG. 9 is a side view of the irregular pattern reader shown in FIG. 8. In the drawings, reference numeral 18 is an optical system for forming a reflected image of the detection surface 9 onto the image pick-up plane of the image pick-up device 7. Numeral 19 is a first cylindrical lens serving as a vertical transfer optical system, and numeral 20 is a second cylindrical lens serving as a horizontal transfer optical system. The first cylindrical lens 19 in the vertical direction and the second cylindrical lens 20 in the horizontal direction are composed of different lenses, respectively. A ridgeline of the first cylindrical lens 19 and a ridgeline of the second cylindrical lens 20 cross each other at right angles.

Operation is described below. When the emission luminous flux L0 from the detection prism 2 owing to the reflected image of the irregular pattern on the detection surface 9 is changed to run in the vertical direction of the reflected image luminous flux L of the irregular pattern in the traveling direction of the luminous flux L of the detection surface 9, based on the relation between the angle of reflection $\theta 3$ at the detection surface 9 and the refraction angle $\theta 5$ at the emission plane 4 of the detection prism 2, width of the luminous flux L is reduced. On the other hand, width of the luminous flux L in the horizontal direction remains unchanged between the detection surface 9 and the emission luminous flux L0. Accordingly, to reproduce the reflected image at the detection surface 9 onto the image pick-up plane of the image pick-up device 7, it is possible to restore the image to the original ratio by using the optical system 18 having different magnifications between the vertical direction and horizontal direction.

Alternatively, by using the optical system 18 having different magnifications in the vertical direction and the horizontal direction, any region of the reflected image on the detection surface 9 can be detected on the whole image pick-up plane of the image pick-up device 7. It is therefore possible to obtain an image of high resolution.

Figure 10:
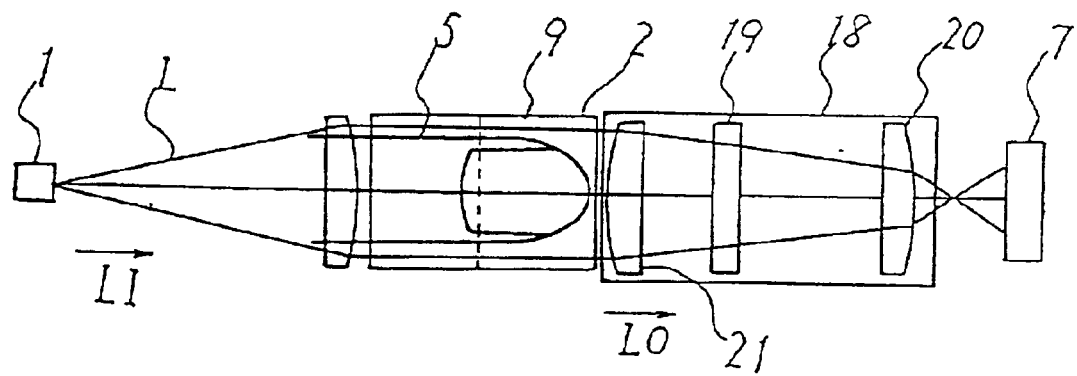
FIG. 10 is a top view of another irregular pattern reader according to Mode 4.
Figure 11:
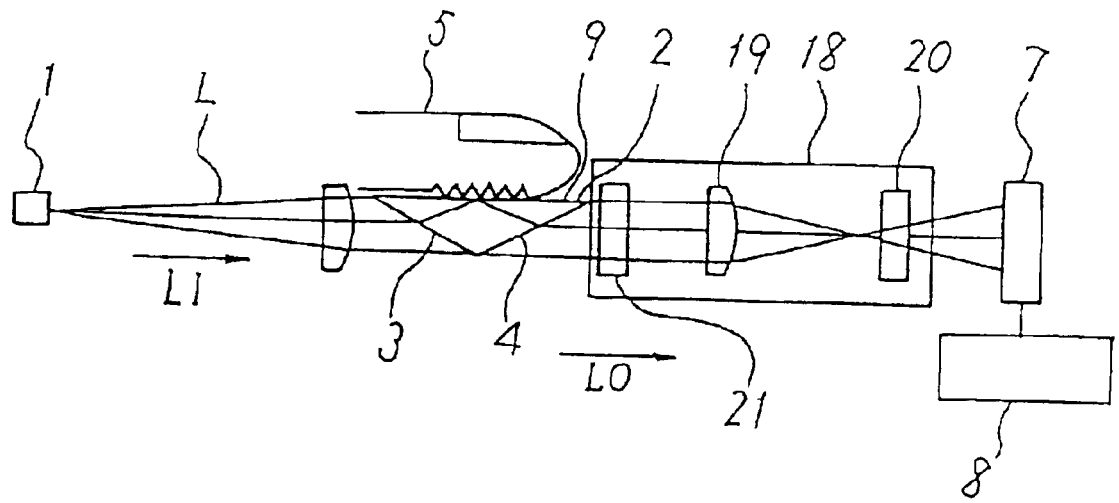
FIG. 11 is a side view of the irregular pattern reader shown in FIG. 10.

FIG. 10 is a top view of another irregular pattern reader according to this Mode 4. FIG. 11 is a side view of the irregular pattern reader shown in FIG. 10. In the drawings, numeral 21 is a third cylindrical lens for horizontally converging the luminous flux L0 emitted from the detection prism 2.

Operation is described below. The luminous flux width in the vertical direction of the emission luminous flux L0 from the detection prism 2 is reduced at the detection prism 2, but the luminous flux in the horizontal direction is emitted without reducing its width. Accordingly, width of the luminous flux in the horizontal direction is larger than that in the vertical direction. Therefore, it is necessary to establish a reduction magnification in the horizontal direction to be larger than that in the vertical direction in order that image size in the horizontal direction approximately coincides with that in the vertical direction. In this case, F value of the second cylindrical lens 20 for carrying out the transference in the horizontal direction becomes small, and it is difficult to manufacture the lens when the F value is excessively small. Therefore, just behind the detection prism 2, the third cylindrical lens 21 is employed to converge beforehand the luminous flux in the horizontal direction and keep the F value of the second cylindrical lens 20 at an appropriate value.

In this manner, the third cylindrical lens 21 is employed just behind the detection prism 2 to converge the luminous flux in the horizontal direction beforehand, and the F value of the second cylindrical lens 20 is kept at an appropriate value in this construction. As a result, the second cylindrical lens 20 is manufactured easily and an image of good reproducibility is obtained.

Figure 12:
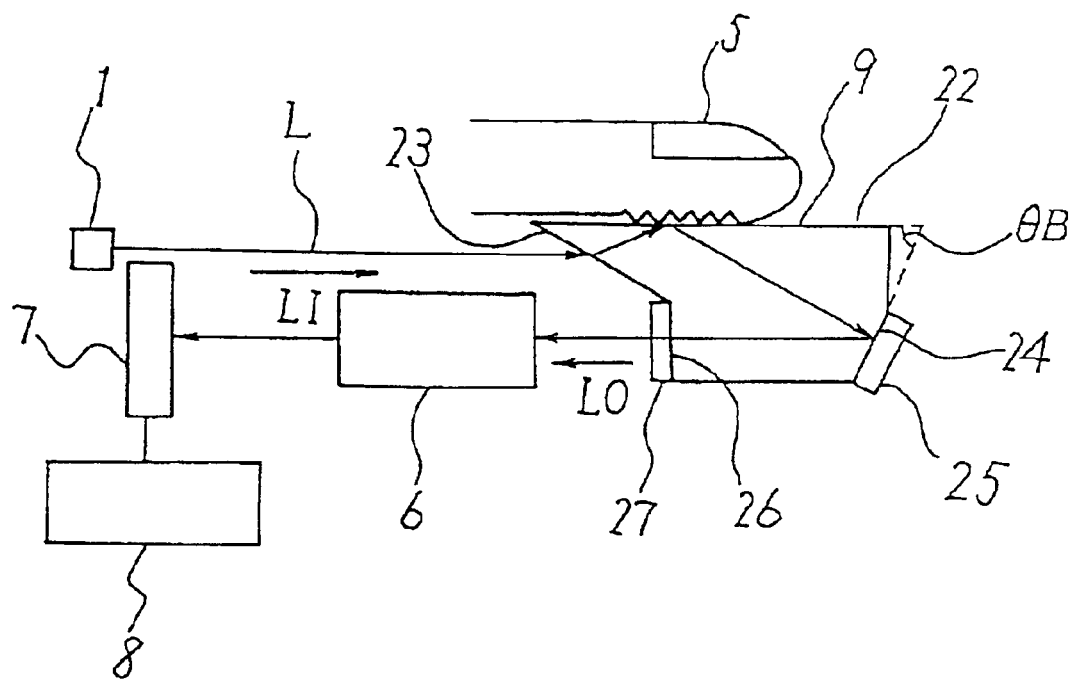
FIG. 12 is a schematic view showing a construction of an irregular pattern reader according to Mode 5 of the invention.

Mode 5:

FIG. 12 is a schematic view showing a construction of an irregular pattern reader according to Mode 5 of the invention. In the drawing, numeral 22 is a detection prism of varied polygon. A cylindrical reflection surface 25 is formed on one of the walls of the detection prism 22, and each angle of the detection prism is established in order that the incident luminous flux LI which is incident on an incident plane 23 in parallel to the detection surface 9 may irradiate the whole irregular pattern and the emission luminous flux L0 from the reflected image may be emitted in a direction opposite and in parallel to the incident luminous flux LI. The cylindrical reflection surface 25 is directly formed on or near the wall 24 of the detection prism 22, and converges the incident luminous flux in the horizontal direction. Numeral 26 is an emission plane in which the luminous flux L0 is emitted from the detection prism 22. Numeral 27 is a cylindrical lens. Other numerals are the same as those in the constructions shown in other modes described above, and further explanation of them is omitted.

Operation is described below. The reflected image on the detection surface 9 of the detection prism 22 is horizontally converged by the cylindrical reflection surface 25 and is vertically converged by the cylindrical lens 27 located on the emission plane 26. Therefore, the optical system 6 forms the image on the image pick-up plane of the image pick-up device 7, and it is possible to make the optical system simple and reduce number of parts.

As a result, it is possible to reduce number of parts and achieve an irregular pattern reader which is thin and short in length.

Figure 13:
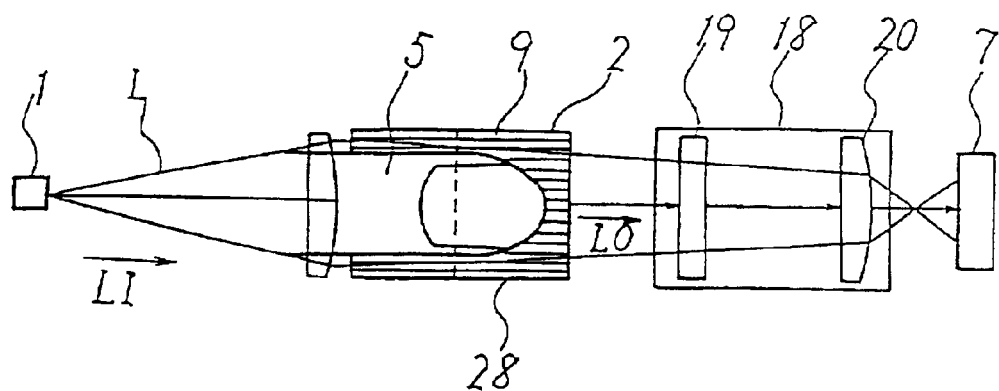
FIG. 13 is a top view of an irregular pattern reader according to Mode 6 of the invention.
Figure 14:
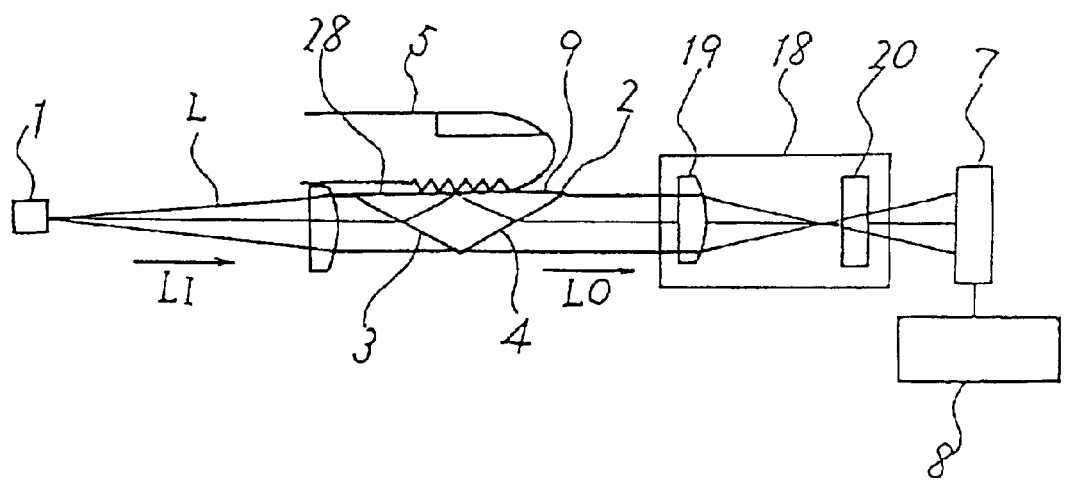
FIG. 14 is a side view of the irregular pattern reader shown in FIG. 13.

Mode 6:

FIG. 13 is a top view of an irregular pattern reader according to Mode 6 of the invention. FIG. 14 is a side view of the irregular pattern reader shown in FIG. 13. In the drawings, reference numeral 28 is luminous flux converging means for converging incident light and emitting the light in a predetermined direction which is formed on the detection surface 9 of the detection prism 2. The luminous flux converging means 28 comprises, for example, a curved surface, a Fresnel lens, a diffraction grating, a three-dimensional hologram and so on, and is directly formed on or near the detection surface 9 of the detection prism 2.

Operation is described below. The luminous flux converging means 28 is formed near the detection surface 9 and the emitting direction of the emission light is fixed. Therefore, the reflected image on the detection surface 9 can be formed onto the image pick-up plane in the horizontal direction using only the second cylindrical lens 20.

In this manner, the luminous flux converging means 28 is formed on or near the detection surface 9 of the detection prism 2. Consequently, the second cylindrical lens 20 is manufactured easily, number of parts is reduced, and image of good reproducibility is obtained.

As a result, it is possible to reduce number of parts and achieve an irregular pattern reader which is thin and short in length.

Figure 15:
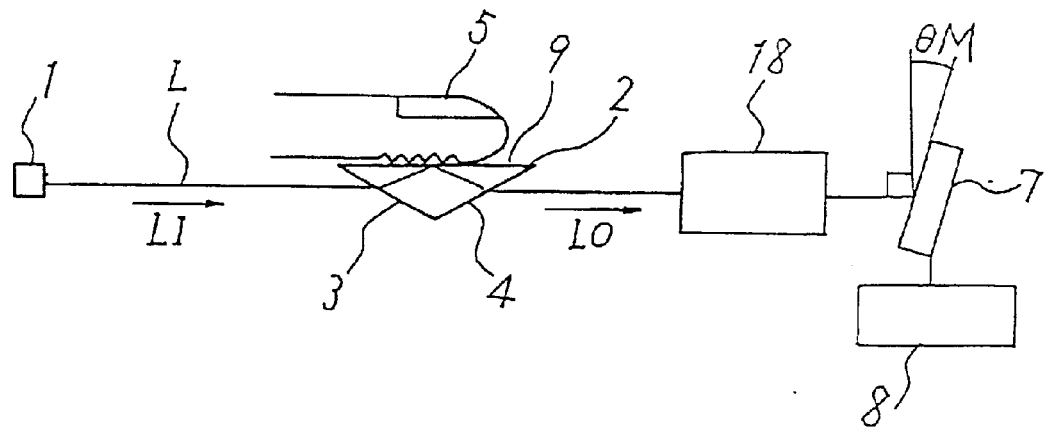
FIG. 15 is a schematic view showing a construction of an irregular pattern reader according to Mode 7 of the invention.

Mode 7:

FIG. 15 is a schematic view showing a construction of an irregular pattern reader according to Mode 7 of the invention. The image pick-up plane of the image pick-up device 7 is inclined at an inclination of $\theta M$ to the optical axis of the emission luminous flux L0.

Operation is described below. The emission luminous flux L0 is not optically vertical to the detection surface 9 of the detection prism 2. Therefore, the distance to the image pick-up device 7 varies due to the position in the detection surface 9, and trapezoidal distortion occurs on the light-receiving plane of the image pick-up device 7.

In the reader shown in FIG. 15, the image pick-up plane of the image pick-up device 7 is inclined at an inclination of $\theta M$ to the optical axis of the emission luminous flux L0, and therefore the trapezoidal distortion is reduced.

Accordingly, it is possible to reduce distortion and achieve an irregular pattern reader which is thin and short in length.

When the light source 1 is a minute luminous point light source such as LED or LD, it is possible to obtain a clearer image.

The same advantage is achieved by inserting a pinhole or a slit in the optical path and restricting width of the optical path.

Figure 16:
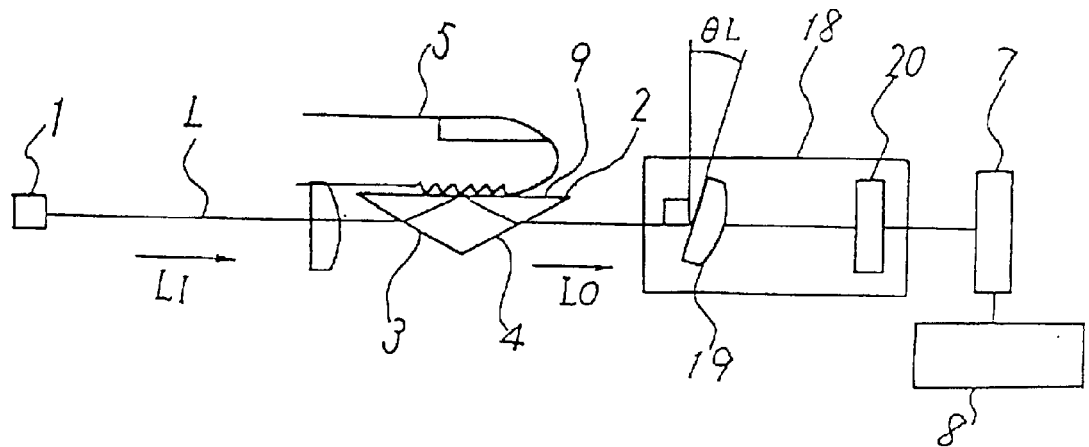
FIG. 16 is a schematic view showing a construction of an irregular pattern reader according to Mode 8 of the invention.

Mode 8:

FIG. 16 is a schematic view showing a construction of an irregular pattern reader according to Mode 8 of the invention. In this mode, the first cylindrical lens 19 of the optical system 18 is inclined at an inclination of θL to the optical axis of the emission luminous flux L0.

Operation is described below. The first cylindrical lens 19 is inclined at an inclination of θL to the optical axis of the emission luminous flux L0, and therefore vertical trapezoidal distortion is reduced. The same advantage is achieved by inclining the optical axis of the second cylindrical lens 20.

Figure 17:
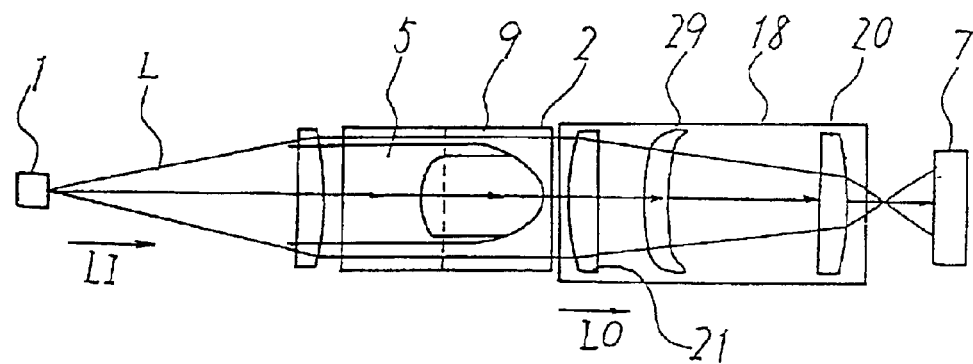
FIG. 17 is a schematic view showing a construction of an irregular pattern reader according to Mode 9 of the invention.

Mode 9:

FIG. 17 is a schematic view showing a construction of an irregular pattern reader according to Mode 9 of the invention. Numeral 29 is a toric lens located in the optical system 18 and corrects a degree of distortion between the central portion of the optical axis and the peripheral portion of the optical axis in the image incident on the optical system 18. Other numerals are the same as those in the constructions of other modes described above, and further explanation of them is omitted.

Operation is described below. The toric lens 29 is located in the optical system 18, and therefore distortion, i.e., distortion aberration caused by difference in magnification between the central portion and the outside of the image is reduced.

As a result, it is possible to reduce the distortion aberration and achieve an irregular pattern reader which is thin and short in length.

Figure 18:
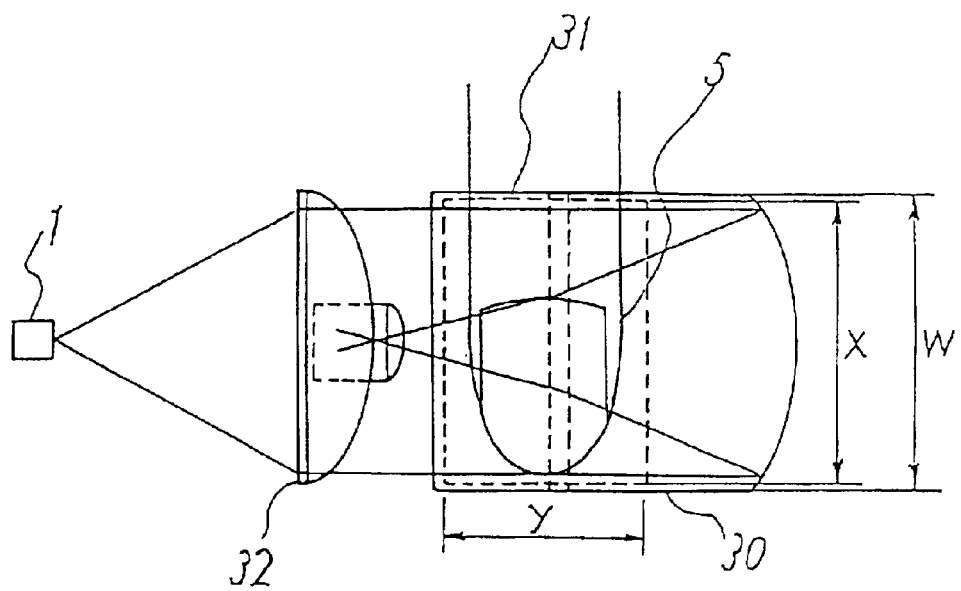
FIG. 18 is a top view of an irregular pattern reader according to Mode 10 of the invention.
Figure 19:
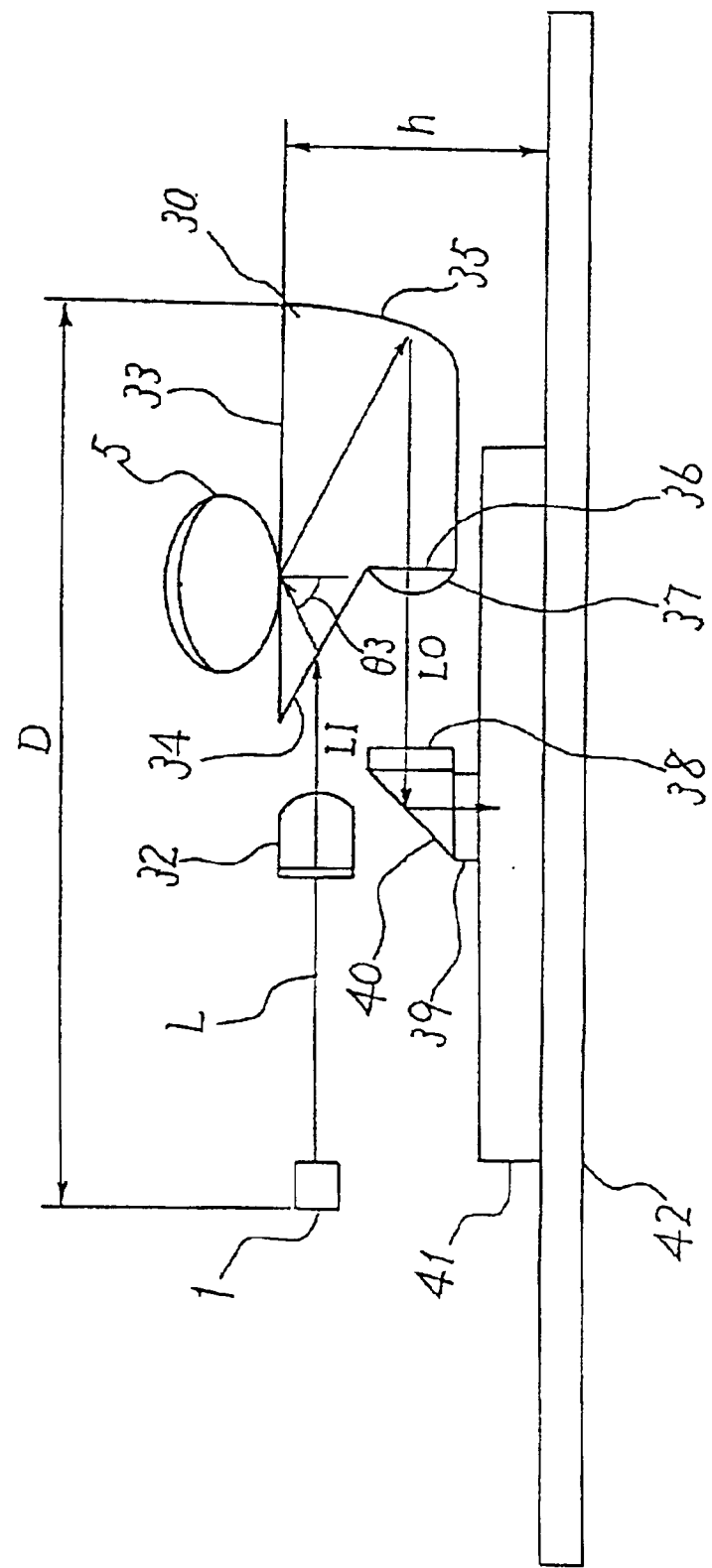
FIG. 19 is a side view of the irregular pattern reader shown in FIG. 18.

Mode 10:

FIG. 18 is a top view of an irregular pattern reader according to Mode 10 of the invention. FIG. 19 is a side view of the irregular pattern reader shown in FIG. 18. In the drawings, reference numeral 1 is a light source, numeral 5 is a fingertip as a subject to be detected, and numeral 30 is a detection prism serving as a prism for detecting the irregular pattern of the fingerprint. Numeral 31 is a detection region on the detection prism 30, numeral 32 is a collimator lens, and numeral 33 is a detection surface of the detection prism 30. Numeral 34 is an incident plane of the detection prism 30, numeral 35 is a reflection surface in the detection prism 30, and numeral 36 is an emission plane of the detection prism 30. Numeral 37 is a first lens, numeral 38 is a second lens, numeral 39 is a third lens, numeral 40 is a prism, numeral 41 is an image pick-up device, and numeral 42 is an electronic substrate. L is a luminous flux, $LI$ is a luminous flux incident upon the detection prism 30, L0 is a luminous flux emitted from the detection prism 30, θA (not shown in the drawings) is an angle between the incident plane 34 and the detection surface 33 of the detection prism 30, and θ3 is an incident angle of the luminous flux L at the detection surface 33.

D is a length of the optical system, W is a width of the optical system, and h is a height from the surface of the electronic substrate 42 to the detection surface 33. x is a width of the detection region 31, and y is a length of the detection region 31.

Operation is described below. The luminous flux L emitted from the light source 1 such as LED or LD is turned into an approximately parallel luminous flux by the collimator lens 32, and is incident upon the detection prism 30 formed of glass or resin, for example. The angle θA is established in order that the incident luminous flux $LI$ may come from the incident plane 34 of the detection prism 30 and irradiate the whole detection region 31 of the detection surface 33, for example, a region of x=20 mm and y=15 mm. The incident angle θ3 at the detection surface 33 is established to satisfy a requirement of being not less than a critical angle to a boundary with the air, and satisfy a requirement of being not more than a critical angle to a boundary with the subject to be detected such as fingerprint. Thus, all the requirements of total reflection are satisfied such that the light is not reflected but transmitted through inside the finger at a portion where a projection face of the fingerprint or the like is in close contact with the detection surface 33 and that an air layer is formed on a recession face of the fingerprint or the like. Accordingly, it is possible to obtain pattern information in which a bright portion is formed by the recessed portion of the fingerprint or the like where light is totally reflected, and a dark portion is formed by the projecting portion of the fingerprint or the like where light is not totally reflected. The luminous flux L including such information is reflected on the reflection surface 35 shaped into a concave facing the luminous flux L and coated with a reflection film or the like, and the reflected luminous flux is emitted as the emission luminous flux L0 from the emission plane 36. The emission plane 36 is shaped into a cylindrical face and forms the first lens 37. The pattern information obtained at the detection surface 33 is transferred to the image pick-up device 41 such as CCD or CMOS sensor by the reflection surface 35, the first lens 37, the second lens 38, and the third lens 39. The second lens 38 and the third lens 39 are formed on the incident plane and the emission plane of the prism 40, respectively. The image pick-up plane of the image pick-up device 41 fixed onto the electronic substrate 42 is located approximately in parallel to the detection surface 33 of the detection prism 30 by bending the luminous flux L at an approximately right angle.

Figure 20:
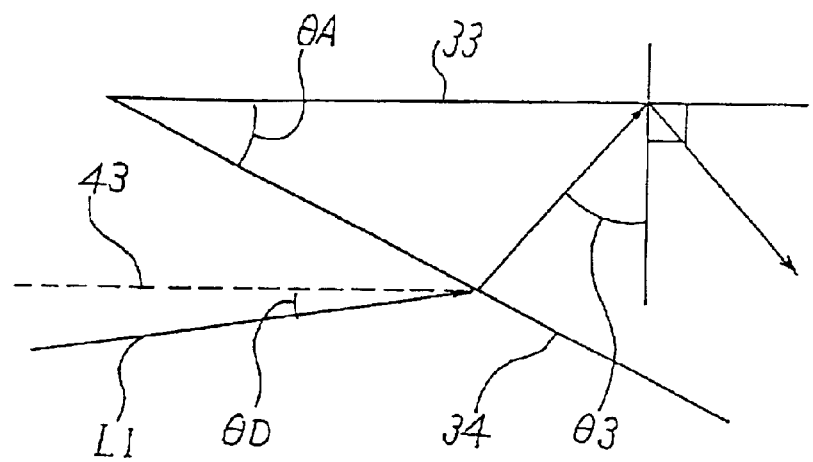
FIG. 20 is an enlarged view in the vicinity of an incident plane 34 of a detection prism 30.

FIG. 20 is an enlarged view in the vicinity of the incident plane 34 of the detection prism 30. The incident luminous flux $LI$ comes in the detection prism 30 from the incident plane 34. The traveling direction is bent due to refraction, and the detection surface 33 is irradiated with the luminous flux $LI$. The angle θD between the optical axis of the incident luminous flux $LI$ and a plane 43 in parallel to the detection surface 33 is established to be approximately 0°. Therefore, the optical axis of the incident luminous flux $LI$ and the plane 43 are substantially in parallel to each other, and it is possible to make the reader thin. The angle θD between the optical axis of the incident luminous flux $LI$ and the plane 43 in parallel to the detection surface 33 is preferably not more than 10°, and more preferably not more than 3°, which is also included in the scope of "being substantially in parallel".

As described above, the detection prism 30 is provided with the reflection surface 35, the first lens 37 is formed on the emission plane 36, and the image pick-up plane of the image pick-up device 41 is located substantially in parallel to the detection surface 33. As a result, it is possible to reduce number of parts and make the reader thin.

In this mode, the detection region 31 of the detection surface 33 is a region of x=20 mm and y=15 mm, however, it is possible to change the region corresponding to the size of the subject to be detected such as fingerprint.

Further, the reflection surface 35 is shaped into a concave, however, it is also preferable that the reflection surface 35 is shaped into an aspherical surface or a plane.

Furthermore, the emission plane 36 is shaped into a cylindrical face, however, it is also preferable that the emission plane 36 is shaped into a spherical surface or an aspherical surface.

Figure 21:
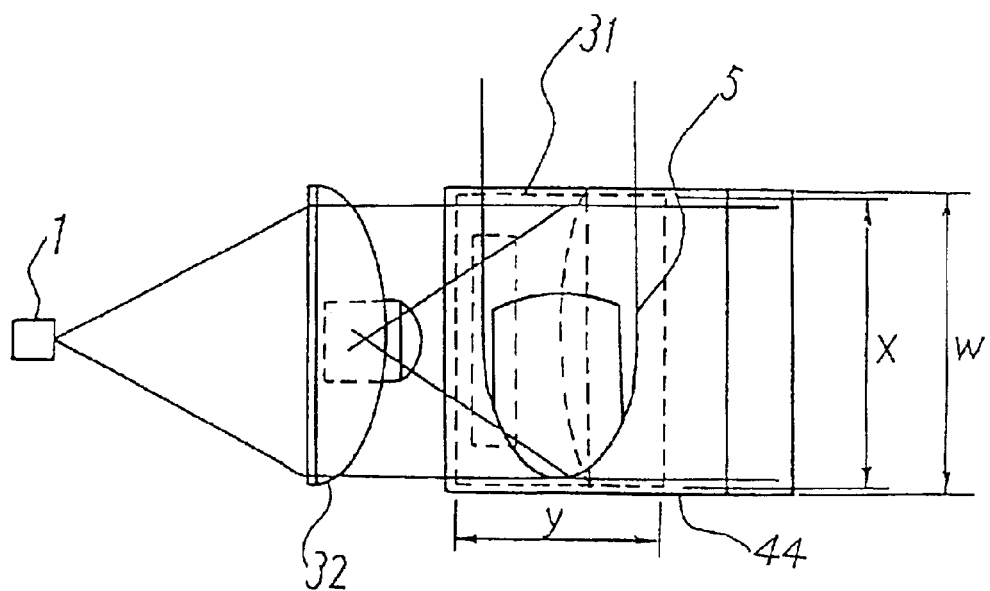
FIG. 21 is a top view of an irregular pattern reader according to Mode 11 of the invention.
Figure 22:
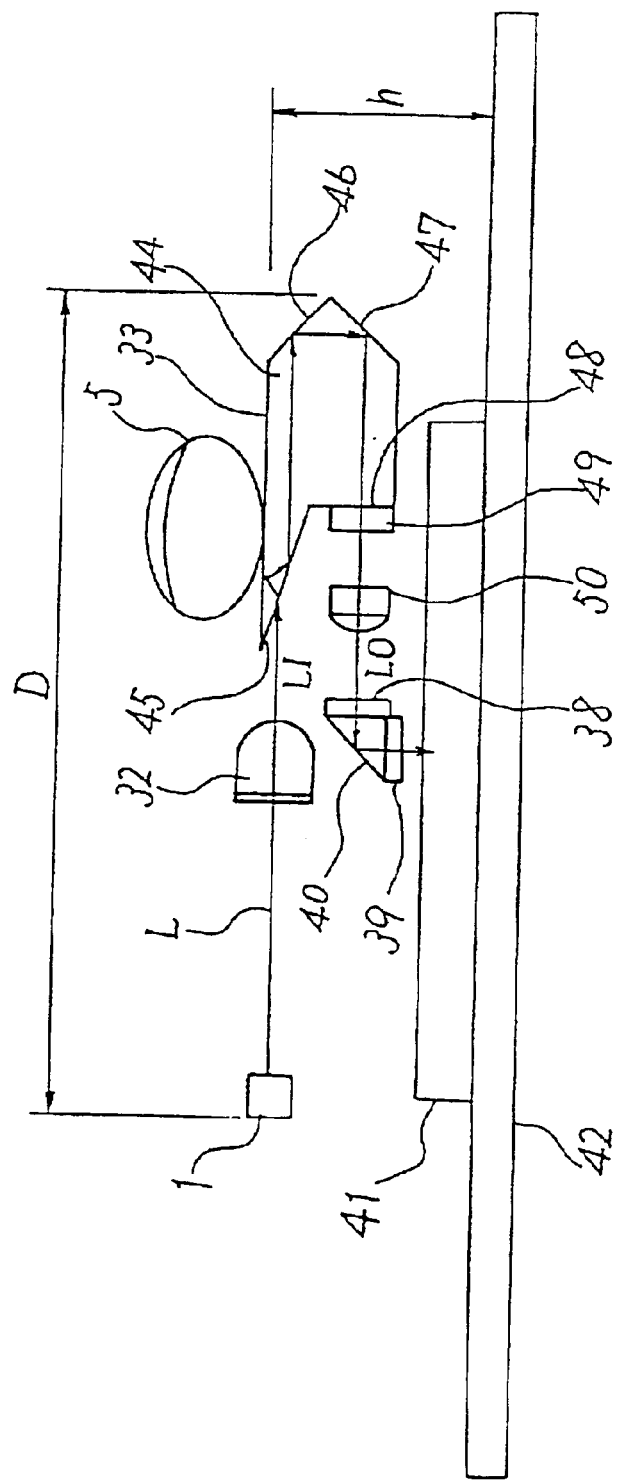
FIG. 22 is a side view of the irregular pattern reader shown in FIG. 21.
Figure 23:
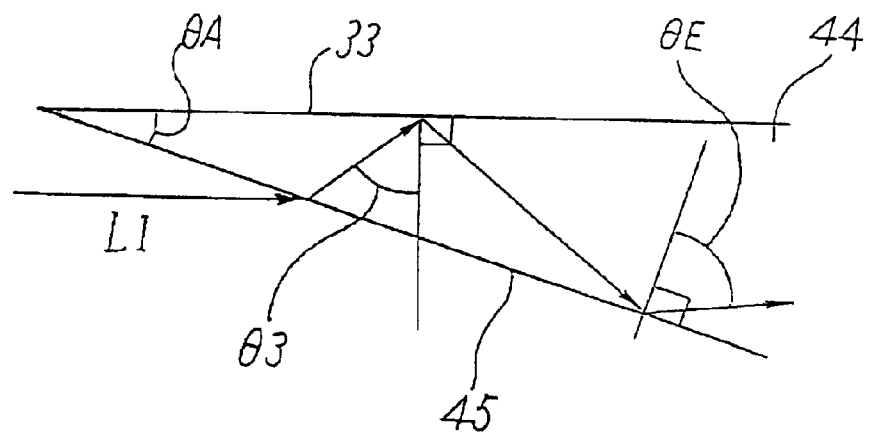
FIG. 23 is an enlarged view in the vicinity of an incident plane 45 of a detection prism 44.

Mode 11:

FIG. 21 is a top view of an irregular pattern reader according to Mode 11 of the invention. FIG. 22 is a side view of the irregular pattern reader shown in FIG. 21. In the drawings, numeral 44 is a detection prism, numeral 45 is an incident plane of the detection prism 44, numeral 46 is a first reflection surface, numeral 47 is a second reflection surface, numeral 48 is an emission plane of the detection prism 44, numeral 49 is a lens located on the emission plane 48, and numeral 50 is a lens. Other numerals are the same as those in the constructions of other modes described above. FIG. 23 is an enlarged view in the vicinity of the incident plane 45 of the detection prism 44. θA is an angle between the incident plane 45 and the detection surface 33 of the detection prism 44, θ3 is an incident angle at the detection surface 33, and θE is an angle of reflection at the incident plane 45.

Operation is described below. The angle θA between the incident plane 45 and the detection surface 33 of the detection prism 44 is reduced and the incident angle θ3 at the detection surface 33 is increased. Thus, the luminous flux including the irregular pattern information of the fingerprint or the like reflected on the detection surface 33 is guided to the incident plane 45 again, is reflected on the incident plane 45, and is emitted from the lens 49 of the emission plane 48 through the first reflection surface 46 of the detection prism 44 and the second reflection surface 47 of the detection prism 44. Each angle of the detection prism 44 is established so that the luminous flux L satisfies the requirements of total reflection at the incident plane 45, the first reflection surface 46, and the second reflection surface 47.

As a result, the angle θA between the incident plane 45 and the detection surface 33 of the detection prism 44 is reduced, and the detection prism 44 becomes thin, and it is possible to make the reader thin.

In this mode, the first reflection surface 46 and the second reflection surface 47 are shaped into flat surfaces, however, it is also preferable that they are shaped into curved surfaces.

Figure 24:
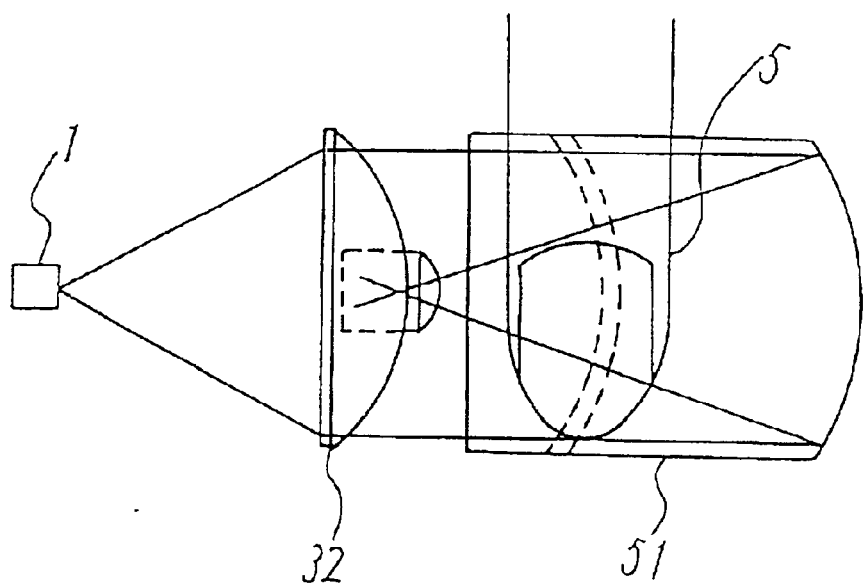
FIG. 24 is a top view of an irregular pattern reader according to Mode 12 of the invention.
Figure 25:
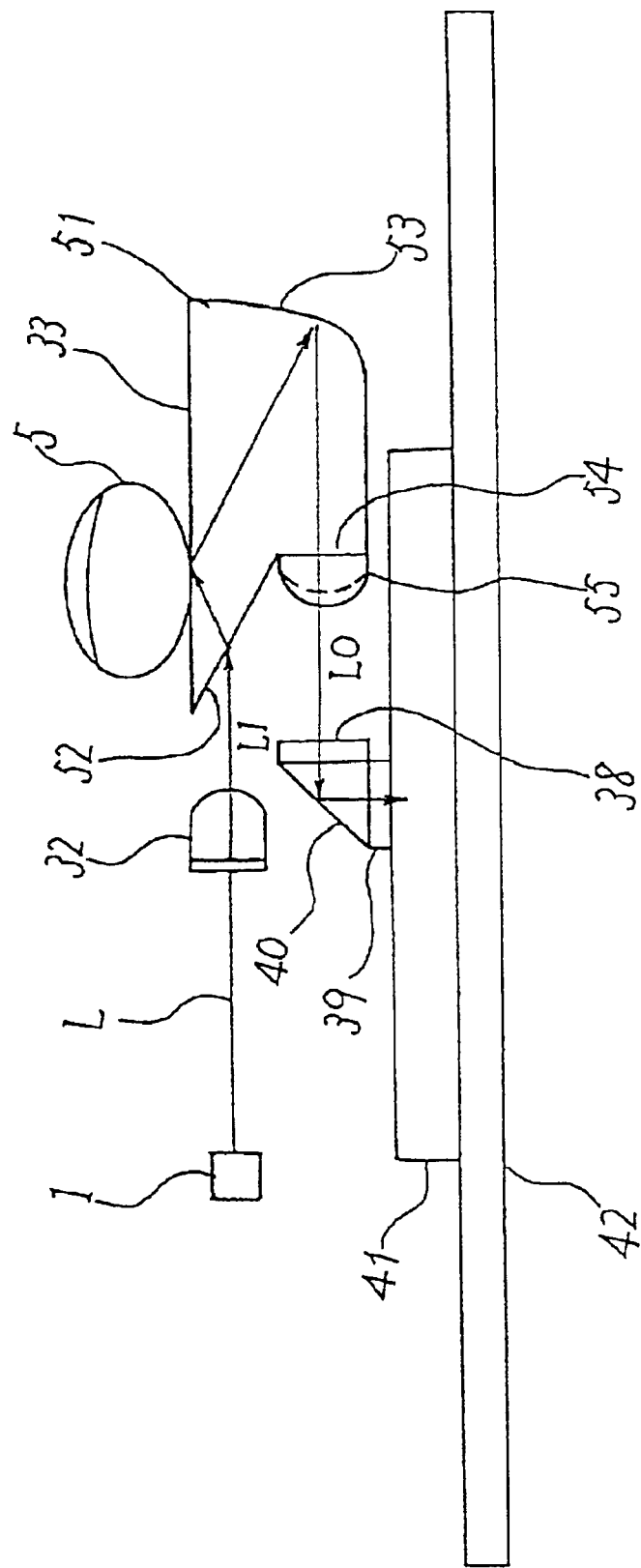
FIG. 25 is a side view of the irregular pattern reader shown in FIG. 24.
Figure 26:
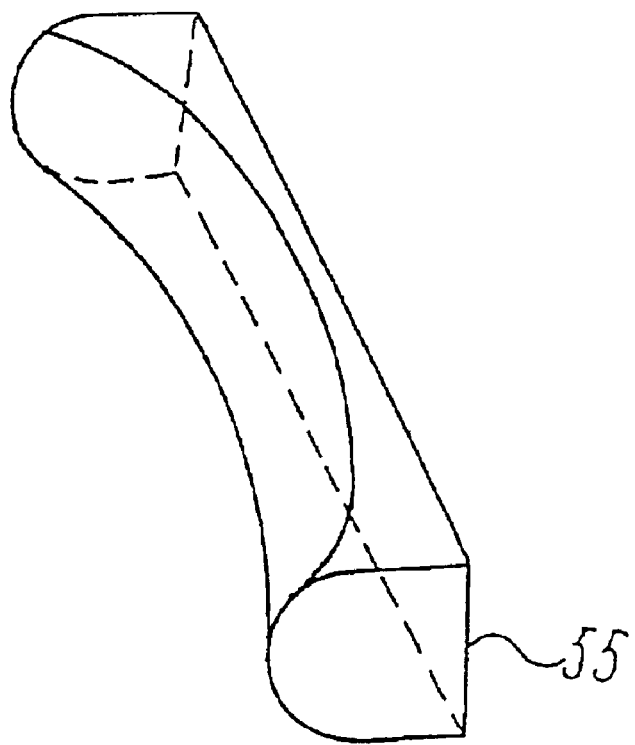
FIG. 26 is a schematic perspective view showing a construction of a toric lens 55.

Mode 12:

FIG. 24 is a top view of an irregular pattern reader according to Mode 12 of the invention. FIG. 25 is a side view of the irregular pattern reader shown in FIG. 24. In the drawings, numeral 51 is a detection prism, numeral 52 is an incident plane of the detection prism 51, numeral 53 is a reflection surface of the detection prism 51, numeral 54 is an emission plane of the detection prism 51, and numeral 55 is a toric lens. Other numerals are the same as those in the constructions of other modes described above. FIG. 26 is a view showing a construction of the toric lens 55.

In mode the emission plane 54 of the detection prism 51 is provided with the toric lens 55.

In this manner, by using the toric lens 55 it becomes possible to transfer the pattern information with less distortion in combination of the reflection surface 53, the toric lens 55, the second lens 38, and the third lens 39.

In this mode, the lens formed on the emission plane 54 is replaced with the toric lens 55, however, it is also preferable to replace the second lens 38 and the third lens 39 with the toric lens 55.

Figure 27:
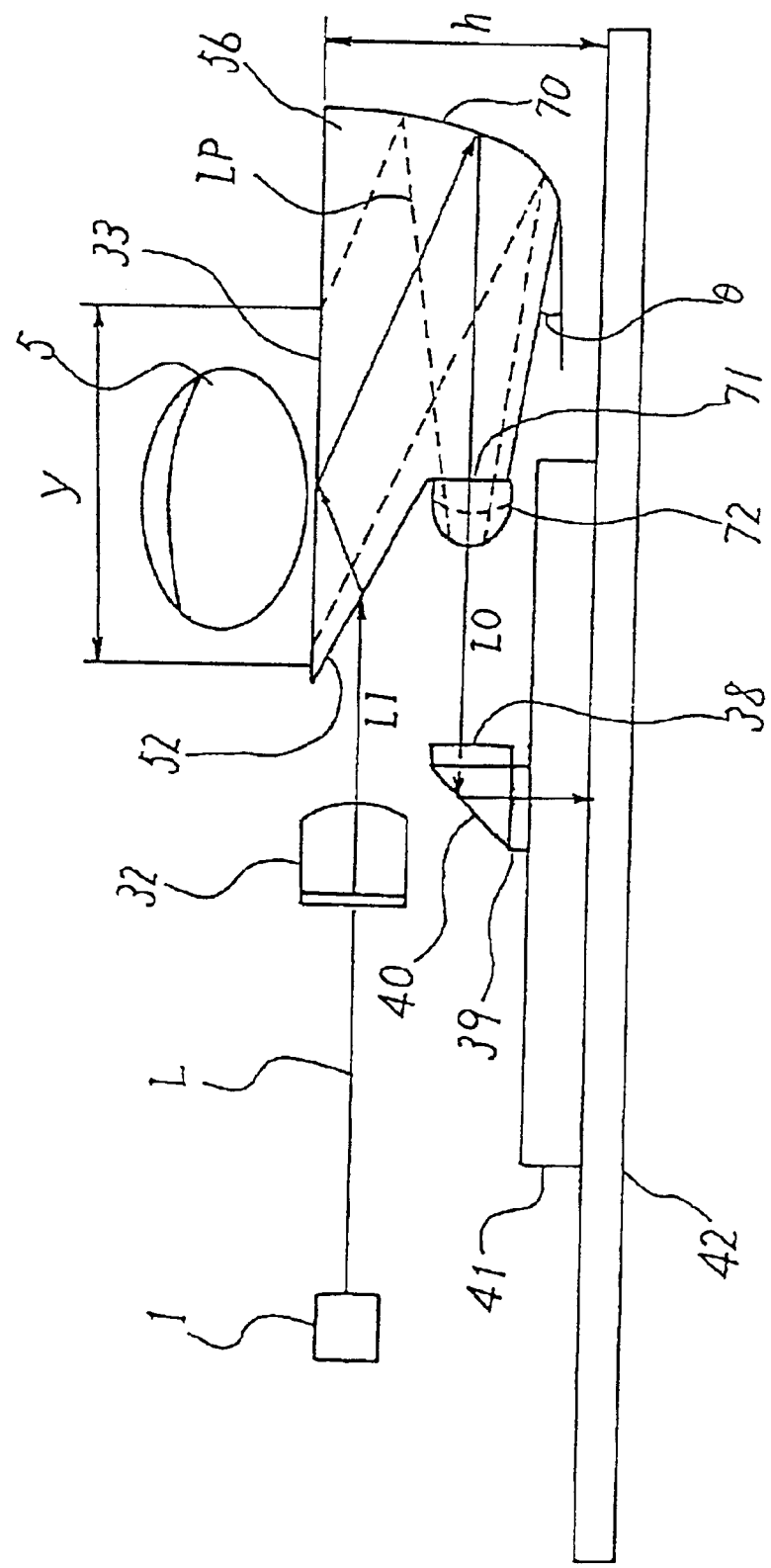
FIG. 27 is a schematic view showing a construction of an irregular pattern reader according to Mode 13 of the invention.

Mode 13:

FIG. 27 is a schematic view showing a construction of an irregular pattern reader according to Mode 13 of the invention. Numeral 56 is a detection prism, numeral 70 is a reflection surface of the detection prism 56, numeral 71 is an emission plane of the detection prism 56, and numeral 72 is a toric lens. Other numerals are the same as those in the constructions of other modes described above. θ indicates an angle between a base and a horizontal plane of the detection prism 56 and LP indicates a luminous flux in the detection prism 56.

In this mode, the base of the detection prism in the foregoing other modes is omitted from the horizontal plane at the angle θ. The omitted region is a region where the luminous flux LI in the detection prism 56 does not pass through.

As described above, the base of the detection prism 56 is omitted from the horizontal plane at the angle θ. As a result, it is possible to place the image pick-up device 41 in the omitted space and make the reader thinner.

In this mode, the base of the detection prism 56 is omitted from the horizontal plane at the angle θ, however, it is also preferable to omit the base in any configuration on condition that the luminous flux LP in the detection prism 56 does not pass through the region.

Furthermore, in the case of the length y of the detection region being not more than 15 mm in FIG. 27, arranging a distance h from the surface of the electronic substrate 42 to the detection surface 33 to be not more than 10 mm makes the reader become as thin as a hard disk drive built in a portable terminal such as a notebook-type personal computer, and it is possible to build the reader in a portable terminal equipment such as notebook-type personal computer.

Figure 28:
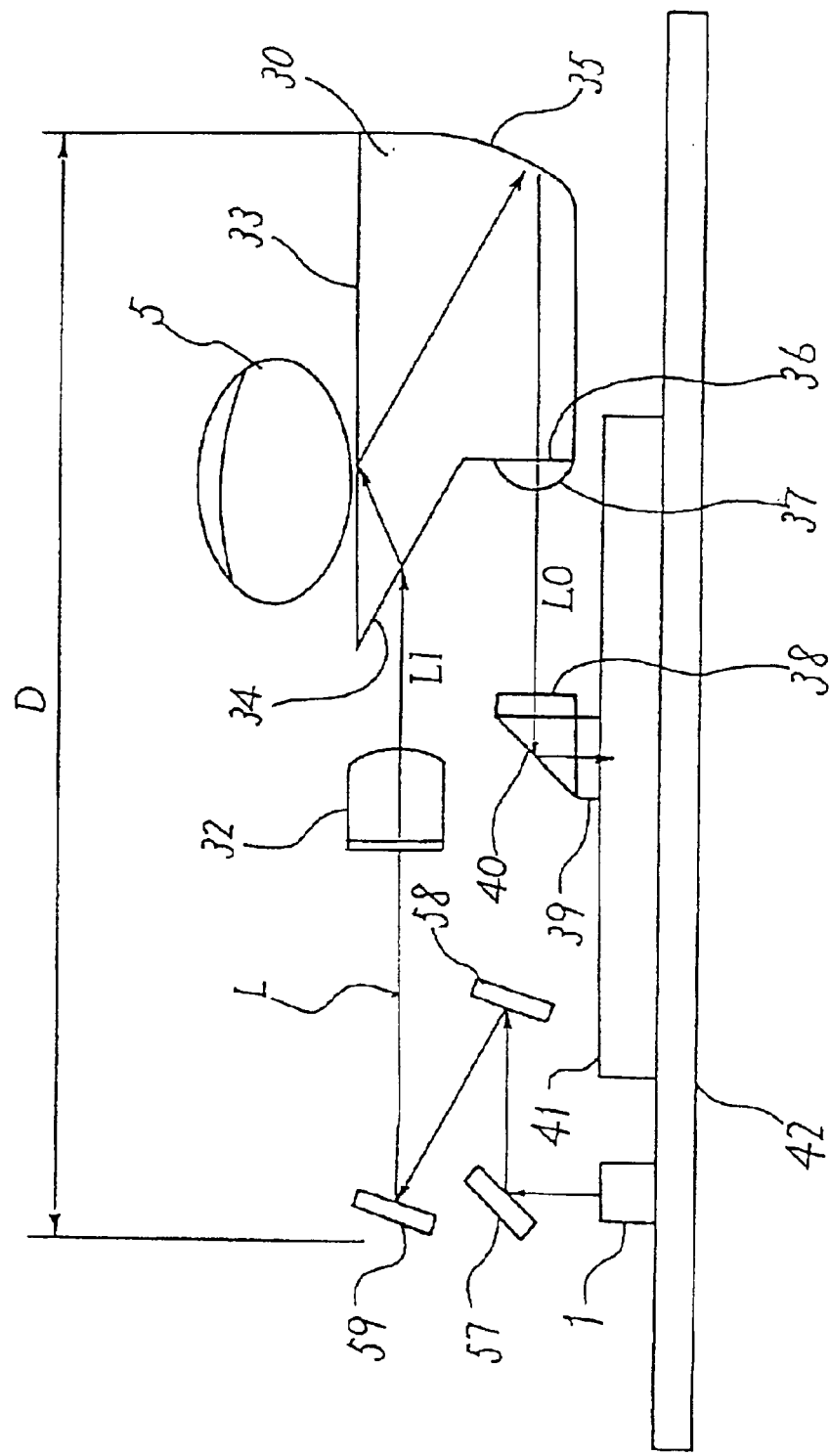
FIG. 28 is a schematic view showing a construction of an irregular pattern reader according to Mode 14 of the invention.

Mode 14:

FIG. 28 is a schematic view showing a construction of an irregular pattern reader according to Mode 14 of the invention. In the drawing, numeral 57 is a first reflex mirror, numeral 58 is a second reflex mirror, and numeral 59 is a third reflex mirror. Other numerals are the same as those in the constructions of other modes described above.

In this mode, a luminous flux emitted from the light source 1 is bent by the first reflex mirror 57, the second reflex mirror 58 and the third reflex mirror 59, and is incident on the collimator lens 32. According to such a construction, the distance from the light source 1 to the collimator lens 32 is shortened while keeping the optical distance from the light source 1 to the collimator lens 32, and it is possible to shorten the length D of the optical system.

Furthermore, it is possible to arrange the luminous flux L emitted from the light source 1 to be perpendicular to the image pick-up plane of the image pick-up device 41 and place the light source 1 and the image pick-up device 41 on the same electronic substrate 42, resulting in a simple construction.

Figure 29:
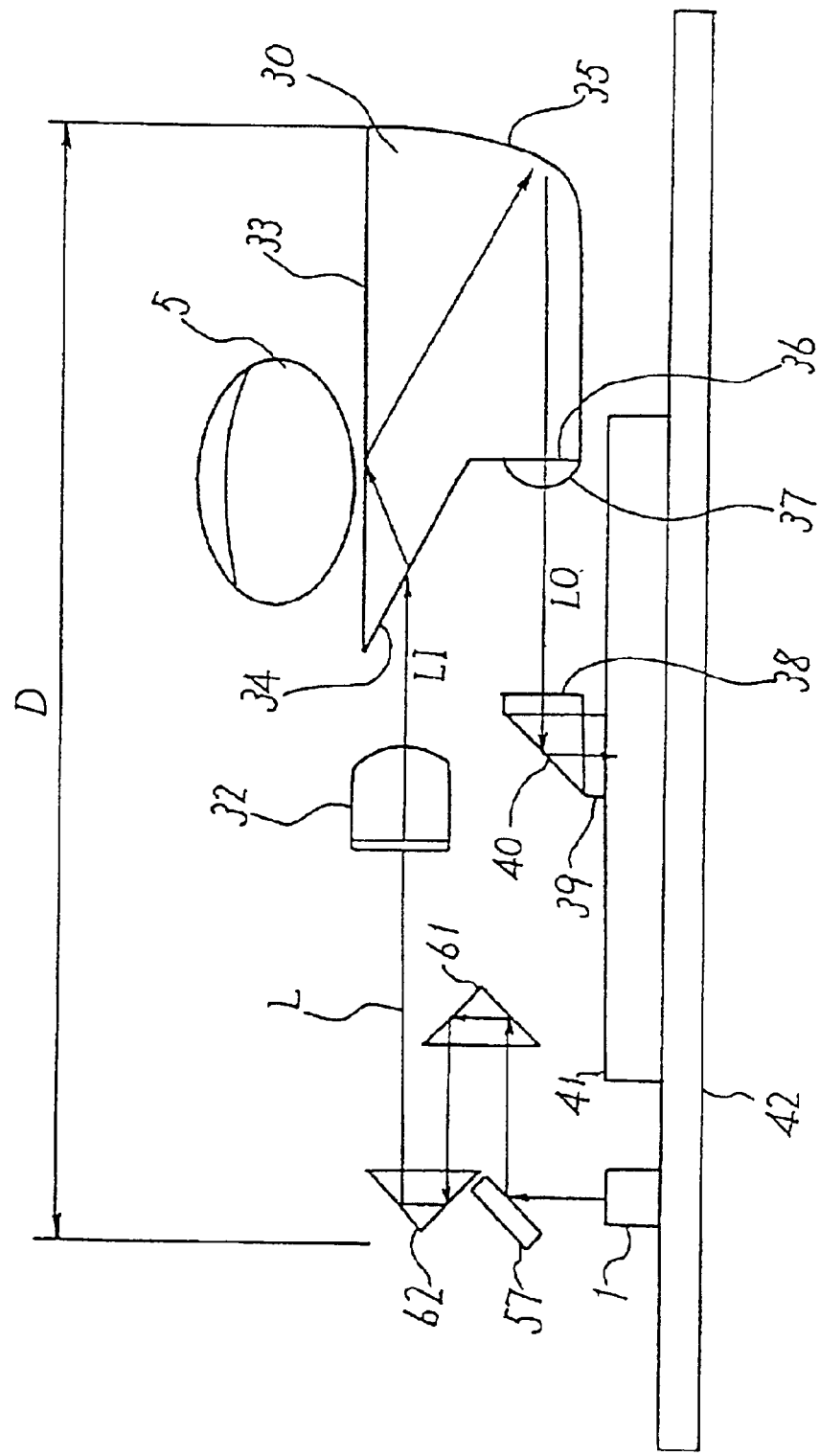
FIG. 29 is a schematic view showing a construction of another irregular pattern reader according to Mode 14.

FIG. 29 is a schematic view showing a construction of another irregular pattern reader according to Mode 14. This reader has a construction in which the second reflex mirror 58 and the third reflex mirror 59 are replaced with a first right-angle prism 61 and a second right-angle prism 62. A luminous flux emitted from the light source 1 is bent by the first reflex mirror 57, the first right-angle prism 61, and the second right-angle prism 62, and is incident on the collimator lens 32.

In such a construction, the distance from the light source 1 to the collimator lens 32 is shortened while keeping the optical distance from the light source 1 to the collimator lens 32, and it is possible to shorten the length D of the optical system.

Furthermore, it is possible to arrange the luminous flux L emitted from the light source 1 to be perpendicular to the image pick-up plane of the image pick-up device 41 and place the light source 1 and the image pick-up device 41 on the same electronic substrate 42, resulting in a simple construction.

Figure 30:
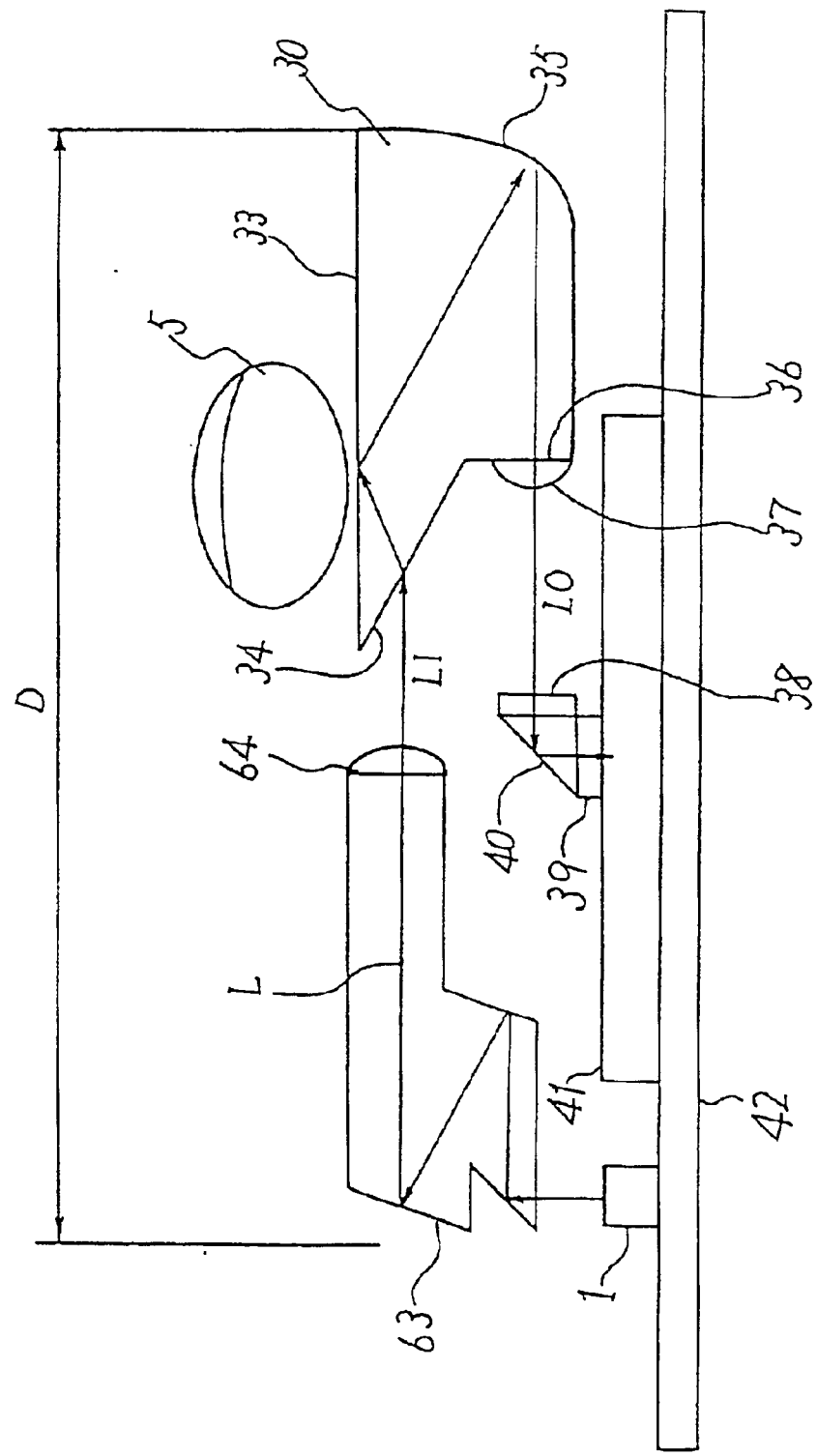
FIG. 30 is a schematic view showing a construction of an irregular pattern reader according to Mode 15 of the invention.

Mode 15:

FIG. 30 is a schematic view showing a construction of an irregular pattern reader according to Mode 15 of the invention. In the drawing, numeral 63 is a turning prism, and numeral 64 is a collimator lens. Other numerals are the same as those in the constructions of other modes described above.

In this mode, the first reflex mirror 57, the second reflex mirror 58, and the third reflex mirror 59, which are separated in FIG. 28, are replaced with the turning prism 63 formed of transparent resin or glass, and the collimator lens 64 is formed on the emission plane of the turning prism 63.

In such a construction, the distance from the light source 1 to the collimator lens 64 is shortened while keeping the optical distance from the light source 1 to the collimator lens 64, and it is possible to shorten the length D of the optical system and reduce number of parts.

Furthermore, it is possible to arrange the luminous flux L emitted from the light source 1 to be perpendicular to the image pick-up plane of the image pick-up device 41 and place the light source 1 and the image pick-up device 41 on the same electronic substrate 42, resulting in a simple construction.

The same advantage is achieved by replacing the first reflex mirror 57, the first right-angle prism 61, and the second right-angle prism 62, as shown in FIG. 29, with the turning right-angle prism formed of transparent resin or glass and forming the collimator lens 64 on the emission plane of the turning right-angle prism.

Figure 31:
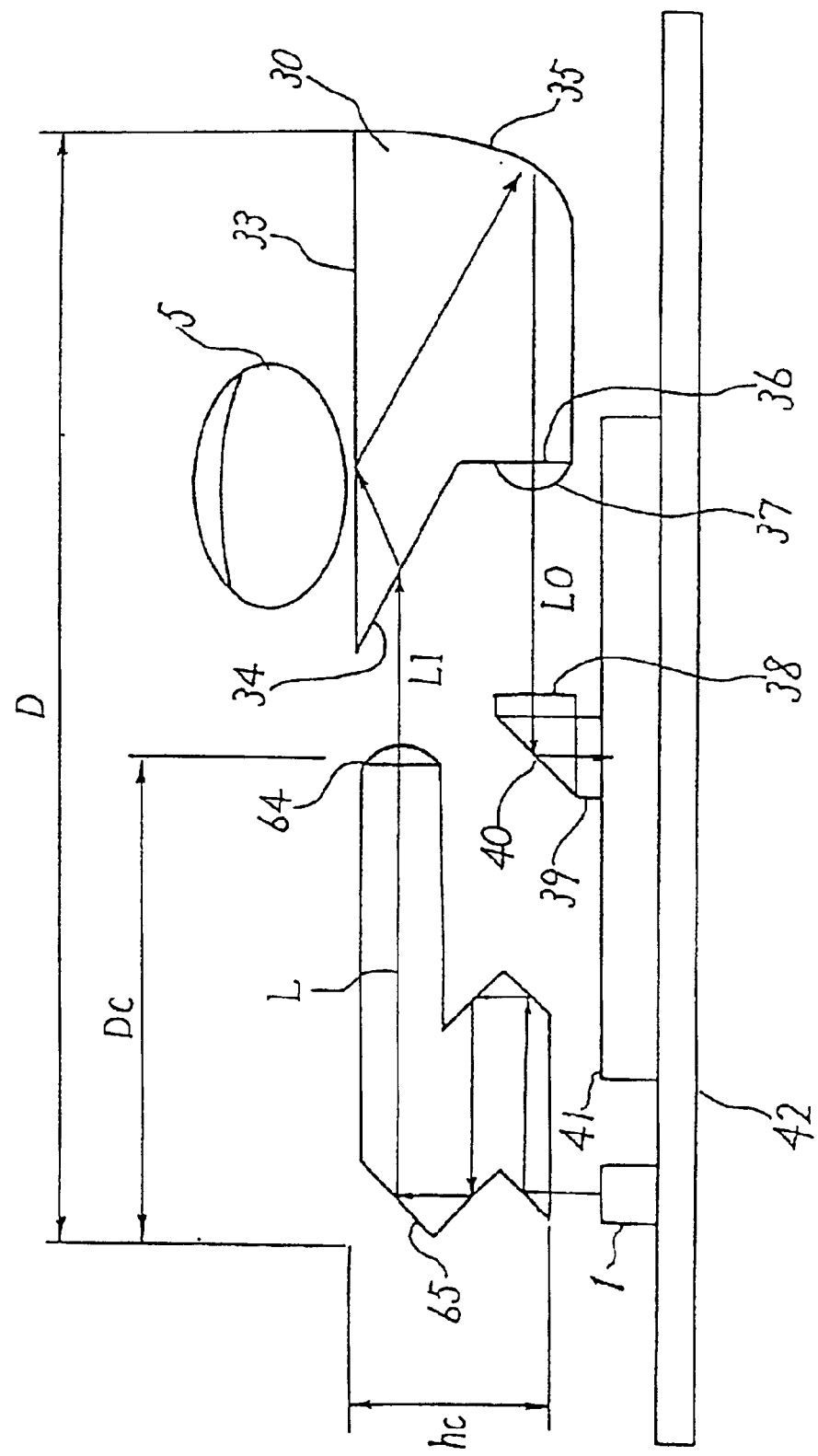
FIG. 31 is a schematic view showing a construction of an irregular pattern reader according to Mode 16 of the invention.

Mode 16:

FIG. 31 is a schematic view showing a construction of an irregular pattern reader according to Mode 16 of the invention. In the drawing, numeral 65 is a turning right-angle prism, Dc is a length of the turning right-angle prism 65, and hc is a height of the turning right-angle prism 65. Other numerals are the same as those in the constructions of other modes described above.

In this mode, when the width x of the detection region 31 is not more than 20 mm, the length Dc of the turning right-angle prism 65 is established to be not more than 15 mm, the height hc is established to be not more than 10 mm, and an NA value of the collimator lens 64 is established to be not more than 0.6.

In such a construction, the reader becomes as thin as a hard disk drive built in a portable terminal equipment such as notebook-type personal computer, and it is possible to build the reader in a portable terminal equipment such as notebook-type personal computer.

Figure 32:
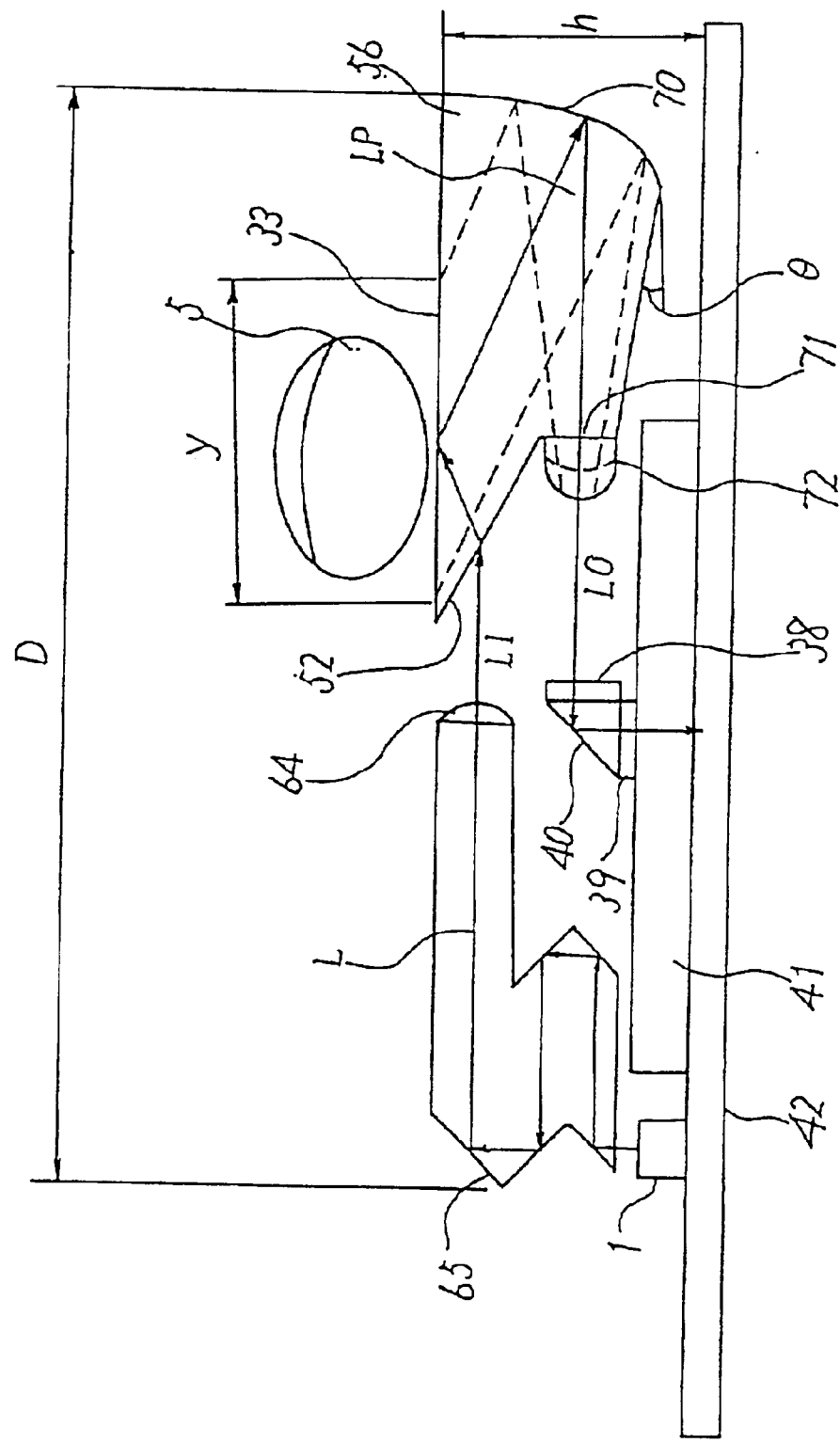
FIG. 32 is a schematic view showing a construction of an irregular pattern reader according to Mode 17 of the invention.

Mode 17:

FIG. 32 is a schematic view showing a construction of an irregular pattern reader according to Mode 17 of the invention.

This mode is a combination of Mode 13 and Mode 16. In the case that the width x of the detection region 31 is not more than 20 mm and the length y is not more than 15 mm, the length D of the optical system of the whole reader is arranged to be not more than 35 mm and the height h from the surface of the electronic substrate 42 to the detection surface 33 is arranged to be not more than 10 mm.

In such a construction, the reader becomes as thin as a hard disk drive built in a portable terminal equipment such as notebook-type personal computer and the installation region of the reader becomes small, and this makes it easy to build the reader in a portable terminal equipment such as notebook-type personal computer.

Figure 33:
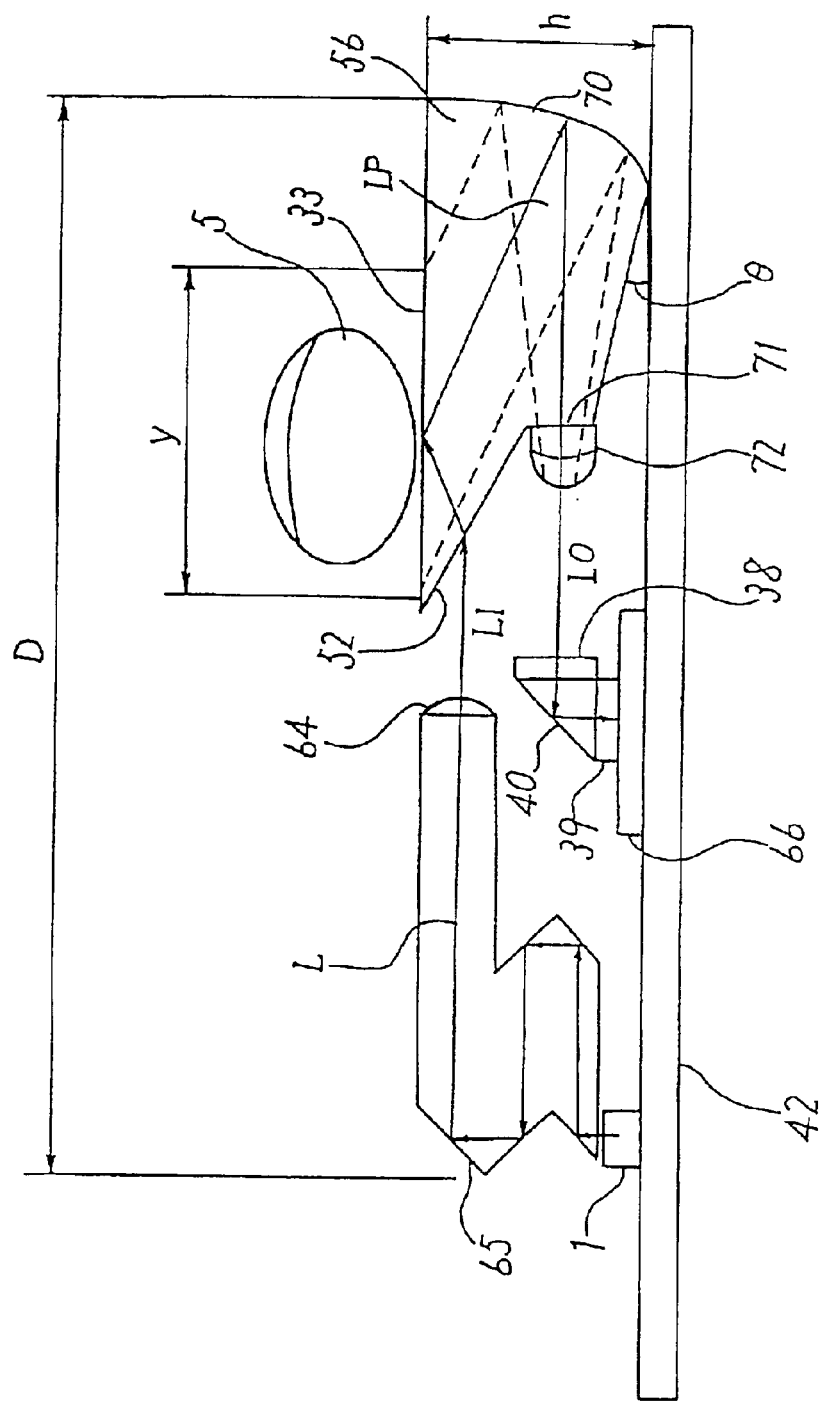
FIG. 33 is a schematic view showing a construction of an irregular pattern reader according to Mode 18 of the invention.
Figure 34:
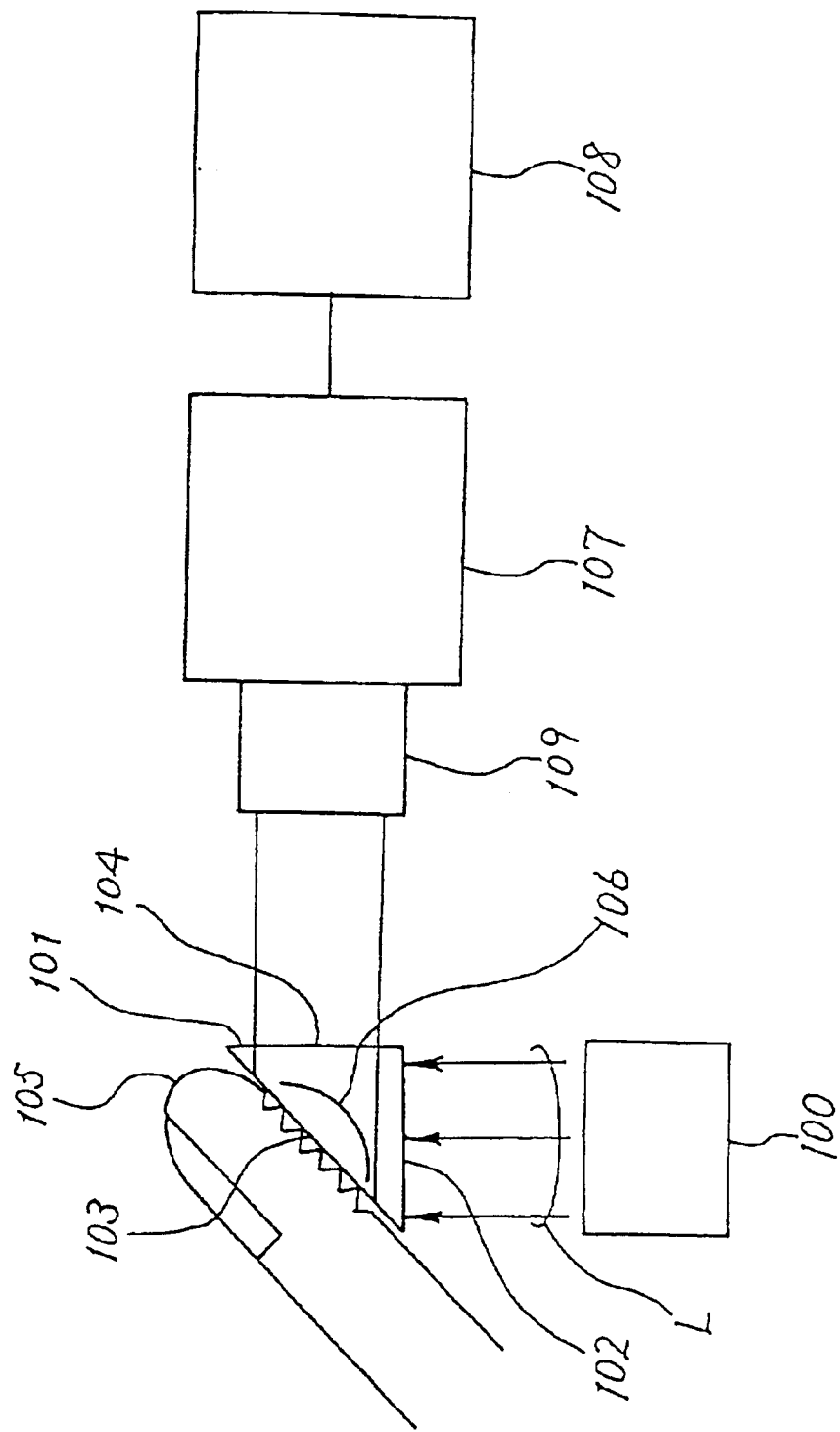
FIG. 34 is a schematic view showing a construction of a conventional irregular pattern reader.

Mode 18:

FIG. 33 is a schematic view showing a construction of an irregular pattern reader according to Mode 18 of the invention.

In this mode, the image pick-up device 66 is directly mounted as a bare chip on the electronic substrate 42 or the third lens 39.

In such a construction, a package for the image pick-up device 66 becomes unnecessary, and this makes the reader thin all the more.

The modes according to the invention have been described above, and it is to be noted that each value of the angle $\theta D$ described in Mode 10 referring to FIG. 20 can be applied to the other modes.

Furthermore, in the foregoing modes excluding Mode 11, a following advantage is achieved by establishing the angle $\theta A$ between the incident plane and the detection surface of the detection prism to be less than 45° and more than an angle obtained by subtracting the angle of reflection $\theta 3$ of the luminous flux to the inner face of the detection surface from 90°. That is, the reader becomes thin by establishing the angle $\theta A$ to be less than 45°. It is also possible to prevent the luminous flux reflected on the detection surface to run against the incident plane by establishing each angle $\theta A$ to be more than the angle obtained by subtracting the foregoing angle of reflection $\theta 3$ from 90°.

The incident angle $\theta 1$ of the incident luminous flux to the detection prism and the refraction angle $\theta 2$ at the incident plane satisfy the Snell's law of $\sin(\theta 1)=n1/n0\cdot\sin(\theta 2)$, and they also geometrically satisfy $\theta A=90°-(\theta 1+\theta D)=\theta 3-\theta 2$. As for $\theta 1$, $\theta 2$, $\theta 3$, $\theta D$, $n1$, and $n0$, they are shown in FIG. 2 and FIG. 20. For example, assuming that the detection prism is of glass or resin of which index of refraction $n1$ is 1.5, when $\theta D$ is approximately 0°, the irregular pattern reader becomes the thinnest by establishing $\theta A$ to be between 24° and 30°.

INDUSTRIAL APPLICABILITY

As has been described so far, the irregular pattern reader according to the present invention is suitable to make the reader small and thin, and is applicable for example, to a fingerprint reader or the like.

What is claimed is:

1. An irregular pattern reader comprising:
   a prism including
      a detection surface on which a subject to be detected, having a irregular pattern, is put,
      a planar incident surface having a first angle of inclination relative to said detection surface, said prism emitting emission light reflected from said detecting surface and corresponding to incident light incident upon said incident surface, and
      a reflection surface for reflecting the light reflected from said detection surface the emission light being substantially parallel to and opposite in direction from the incident light;
   a first optical system including a light source, light from the light source being incident on said incident surface of said prism, the light having an optical axis substantially parallel to said detection surface where the light is incident on said incident surface;
   an image pick-up device; and
   a second optical system for transmitting the emission light emitted from said prism to said image pick-up device.

2. The irregular pattern reader according to claim 1, wherein said reflection surface has a second angle of inclination relative to said detection surface, and light from said detection surface diverted at said reflection surface is emitted from said prism through said incident surface as the emission light.

3. The irregular pattern reader according to claim 2, wherein said prism includes a reflection member on said reflection surface.

4. The irregular pattern reader according to claim 1, wherein
said prism includes a lens portion receiving light reflected from said reflection surface and directing the light to said second optical system, and
an image pick-up surface of said image pick-up device is substantially parallel to said detection surface.

5. The irregular pattern reader according to claim 4, wherein a region through which a luminous flux in said prism does not pass is omitted from said prism at a surface facing said detection surface.

6. The irregular pattern reader according to claim 5, wherein said detection surface of said prism is approximately 20 mm in width and approximately 15 mm in length, and said prism is not more than 10 mm in a thickness direction extending from said detection surface of said prism toward said image pick-up device.

7. The irregular pattern reader according to claim 4, wherein said second optical system is located on the image pick-up surface of said image pick-up device.

8. The irregular pattern reader according to claim 7, wherein said first optical system including said light source is located on an electronic substrate, and has a collimator lens and incident light turning means located between said light source and said collimator lens, and incident light is incident upon said incident surface from said light source through said incident light turning means and said collimator lens.

9. The irregular pattern reader according to claim 8, wherein said incident light turning means includes a transparent block, and an incident light emission surface of said incident light turning means includes said collimator lens.

10. The irregular pattern reader according to claim 9, wherein said incident light turning means is not more than 10 mm in thickness.

11. The irregular pattern reader according to claim 4, wherein a region through which a luminous flux in said prism does not pass is omitted from said prism at a surface facing said detection surface, said second optical system and said image pick-up device are respectively located on an electronic substrate, and each of the elements mounted on said electronic substrate has a thickness of no more than 10 mm and a length no more than 35 mm, and said detection surface of said prism is approximately 20 mm in width and approximately 15 mm in length.

12. The irregular pattern reader according to claim 11, wherein said image pick-up device is mounted as a bare chip on one of said electronic substrate and said second optical system.

13. The irregular pattern reader according to claim 4, wherein said prism includes a concave reflecting surface reflecting to said emission surface light reflected from said detection surface.

14. The irregular pattern reader according to claim 13, wherein said lens portion is a cylindrical surface.

15. The irregular pattern reader according to claim 13 wherein said lens portion includes a toric lens mounted on said prism.

16. The irregular pattern reader according to claim 4, wherein said prism includes two reflection surfaces and the light reflected from said detection surface is reflected a second time from said incident surface and, sequentially, from each of said two reflection surfaces and is emitted through said lens portion.

17. The irregular pattern reader according to claim 4, wherein
said reflection surface has a cylindrical reflection surface for converging in a horizontal direction the light reflected from said detection surface, and
said lens portion includes a cylindrical lens for converging in a vertical direction, transverse to the horizontal direction, the light reflected from said cylindrical reflection surface.

18. The irregular pattern reader according to claim 1, wherein said prism includes a planar emission surface having a second angle of inclination relative to said detection surface, different from the first angle of inclination, and through which the emission light is emitted from said prism, said incident surface and said emission surface being contiguous.

* * * * *